United States Patent
Iwasaki

(10) Patent No.: US 7,771,104 B2
(45) Date of Patent: Aug. 10, 2010

(54) PLANAR LIGHTING DEVICE

(75) Inventor: Osamu Iwasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 235 days.

(21) Appl. No.: 12/134,866

(22) Filed: Jun. 6, 2008

(65) Prior Publication Data

US 2008/0304286 A1 Dec. 11, 2008

(30) Foreign Application Priority Data

Jun. 7, 2007 (JP) .............................. 2007-151527

(51) Int. Cl.
*F21V 7/04* (2006.01)
(52) U.S. Cl. ...................... 362/628; 362/613; 362/612
(58) Field of Classification Search .................. 362/628, 362/613, 615, 612, 621, 629, 600, 611, 800
See application file for complete search history.

(56) References Cited

U.S. PATENT DOCUMENTS

| 5,993,020 | A | 11/1999 | Koike | |
|---|---|---|---|---|
| 6,217,184 | B1 | 4/2001 | Koike et al. | |
| 7,244,059 | B2 * | 7/2007 | Onishi | 362/628 |
| 7,572,045 | B2 * | 8/2009 | Hoelen et al. | 362/628 |
| 7,614,775 | B2 * | 11/2009 | Iwasaki | 362/616 |
| 2002/0114148 | A1 * | 8/2002 | Flohr et al. | 362/31 |
| 2003/0043567 | A1 * | 3/2003 | Hoelen et al. | 362/31 |
| 2004/0080924 | A1 * | 4/2004 | Chuang | 362/27 |
| 2005/0185394 | A1 | 8/2005 | Sakamoto et al. | |
| 2006/0056166 | A1 | 3/2006 | Yeo et al. | |
| 2006/0061705 | A1 | 3/2006 | Onishi | |

FOREIGN PATENT DOCUMENTS

| JP | 7-36037 | A | 2/1995 |
|---|---|---|---|
| JP | 8-248233 | A | 9/1996 |
| JP | 8-271739 | A | 10/1996 |
| JP | 11-153963 | A | 6/1999 |
| WO | 03/083530 | A1 | 10/2003 |

OTHER PUBLICATIONS

European Communication dated Sep. 30, 2008, issued in corresponding EP application No. 08010347.6 (7 pages).

* cited by examiner

*Primary Examiner*—Bao Q Truong
(74) *Attorney, Agent, or Firm*—Sughrue Mion, PLLC

(57) ABSTRACT

The absolute value of the light amount is increased by providing main light sources and auxiliary light sources on four sides of a light guide plate having a flat and rectangular light exit plane whereas the amounts of light emitted by LED chips of the main light sources and the auxiliary light sources are adjusted such that illuminance is highest near the central area of the light guide plate to obtain a high-in-the-middle, bell-curve illuminance distribution for light emitted by the light guide plate. A planar lighting device achieving a reduced thickness and weight and capable of emitting an increased amount of illumination light is provided.

8 Claims, 9 Drawing Sheets

PLANAR LIGHTING DEVICE

The entire contents of literature cited in this specification are incorporated herein by reference.

BACKGROUND OF THE INVENTION

The present invention relates to a planar lighting device comprising light sources and a light guide plate for admitting light emitted by the light sources and emitting the light through the light exit plane thereof. The inventive planar lighting device is used for indoor and outdoor illumination or as a backlight to illuminate the liquid crystal display panel used in liquid crystal display devices or as a backlight used for advertising panels, advertising towers, advertising signs, and the like.

Liquid crystal display devices use a backlight unit for radiating light from behind the liquid crystal display panel to illuminate the liquid crystal display panel. A backlight unit is configured using optical members comprising a light guide plate for diffusing light emitted by an illumination light source to irradiate the liquid crystal display panel, a prism sheet, and a diffusion sheet.

Currently, large liquid crystal display televisions predominantly use a so-called direct illumination type backlight unit having no light guide plate but comprising optical members such as a diffusion plate disposed immediately above the illumination light source. This type of backlight unit comprises cold cathode tubes serving as a light source provided on the rear side of the liquid crystal display panel whereas the inside of the backlight unit provides white reflection surfaces to secure uniform light amount distribution and a necessary brightness.

To achieve a uniform light amount distribution with the direct illumination type backlight unit, however, the backlight unit needs to have a given thickness, say about 30 mm, in a direction perpendicular to the liquid crystal display panel. While demands of still thinner backlight units are expected to grow in the future, achieving a further reduced thickness of say 10 mm or less with a backlight unit is difficult in view of uneven light amount distribution expected to accompany the direct illumination type.

Among backlight units that allow reduction of thickness thereof is a backlight unit using a light guide plate whereby light emitted by illumination light sources and admitted into the light guide plate is guided in given directions and emitted through a light exit plane that is different from the plane through which light is admitted.

There has been proposed a backlight of a type described above using a light guide plate formed by mixing scattering particles for diffusing light into a transparent resin, for which reference may be had, for example, to JP 07-36037 A, JP 08-248233 A, JP 08-271739 A, and JP 11-153963 A.

JP 07-36037 A, for example, discloses a light diffusion light guide light source device comprising a light diffusion light guide member having at least one light entrance plane region and at least one light exit plane region and light source means for admitting light through the light entrance plane region, the light diffusion light guide member having a region that has a tendency to decrease in thickness with the increasing distance from the light entrance plane.

JP 08-248233 A discloses a planar light source device comprising a light diffusion light guide member, a prism sheet provided on the side of the light diffusion light guide member closer to a light exit plane, and a reflector provided on the rear side of the light diffusion light guide member. JP08-271739 A discloses a liquid crystal display comprising a light emission direction correcting element formed of sheet optical materials provided with a light entrance plane having a repeated undulate pattern of prism arrays and a light exit plane given a light diffusing property. JP 11-153963 A discloses a light source device comprising a light diffusion light guide member having a scattering power therein and light supply means for supplying light through an end plane of the light diffusion light guide member.

In the planar lighting devices provided with a light diffusion light guide plate containing light scatterers mixed therein as disclosed in the above prior art literature, light emitted by the light source and admitted through the light entrance plane into the light diffusion light guide member receives a single or a multiple scattering effect at a given rate as the light propagates through the inside of the light diffusion light guide member. Moreover, a significant proportion of light that reaches both end planes of the diffusion light guide member or a surface of the reflector receives reflection effect and is returned back into the diffusion light guide member.

The above composite process produces light beam that is emitted through the light exit plane highly efficiently with a directivity to travel obliquely forward as viewed from the light source. Briefly, light radiated by the light source is emitted through the light exit plane of the light diffusion light guide member.

Thus, the prior art literature mentioned above purportedly states that a light guide plate containing scattering particles mixed therein is capable of emitting uniform light with a high light emission efficiency.

As regards the light guide plate used in the planar lighting device, there have been disclosed a light guide plate in the form of a flat plate and a light guide plate composed of a portion shaped to have a region with a tendency to grow thinner with the increasing distance from the light entrance plane attached to the other portion, in addition to the light guide plate mentioned above that is shaped to have a region with a tendency to grow thinner with the increasing distance from the light entrance plane.

SUMMARY OF THE INVENTION

However, to achieve increased dimensions with the planar lighting device using any of the light guide plates disclosed in the above prior art literature, light needs to travel a longer distance from the light source, which in turn requires the light guide plate itself to be made thicker. Thus, an attempt to enlarge a display screen or a display area of a planar lighting device is confronted with difficulties in reducing the thickness and the weight of the planar lighting device.

Thus, an object of the present invention is to provide a planar lighting device that eliminates problems accompanying the above prior art and allows a greater amount of illumination light to be emitted with a thinner design and a lighter weight.

To solve the above problems, the present invention provides a planar lighting device comprising:
  a light guide plate including:
    a light exit plane being flat and rectangular, for emitting planar light;
    four light entrance planes, each for admitting light traveling parallel to the light exit plane, and each being formed along each of four sides of the light exit plane; and
    a pair of rear planes being formed on a side opposite from the light exit plane and inclined such that a thickness of the light guide plate in a direction perpendicular to the light exit plane grows thicker with an increasing distance from each of a pair of opposite light entrance planes in the four light entrance planes and joining each other in a middle between the pair of opposite light entrance planes; and four light sources, each for emitting each of the four light entrance planes and for admitting the emitted light through the four light entrance planes, and each being disposed opposite each of the four light entrance planes of the light guide plate, wherein each of the four light sources has LED chips and a support for supporting the LED chips, and wherein the LED chips of each of the four light sources are arrayed on a plane of the support facing each of the four light entrance planes in a longitudinal direction of each of the four light entrance planes.

According to the invention as described above, the LED chips preferably comprise LEDs each emitting different amounts of light, respectively.

Further, the LED chips are preferably adjusted independently of each other to their respective amounts of light.

Further, an amount of light I of each of the LED chips is preferably adjusted to satisfy $0 < I \leq 1$ when an amount of light of one of the LED chips adjacent a central portion of each light entrance plane is 1.

Further, the four light entrance planes preferably comprises:

a first light entrance plane and a second light entrance plane being formed on a pair of opposite sides of the light exit plane and constituting the pair of opposite light entrance planes, and a third light entrance plane and a fourth light entrance plane being formed on another pair of opposite sides of the light exit plane and constituting another pair of opposite light entrance planes, wherein the pair of rear planes are composed of a pair of inclined planes that are parallel to the light exit plane in a direction along the first light entrance plane and the second light entrance plane, respectively, come closest to the light exit plane at the first light entrance plane and the second light entrance plane, respectively, and are distanced farthest from the light exit plane along a central joint of the pair of rear planes joining each other in the middle between the first light entrance plane and the second light entrance plane.

Further, each of the LED chips preferably has a configuration satisfying an inequality b>a where "a" denotes a length in a thickness direction of the light guide plate and "b" denotes a length in a direction perpendicular to the thickness direction of the light guide plate.

Preferably, the light guide plate contains therein numerous scattering particles, and satisfies following inequalities:

$27/100000 < (D2-D1)/(L/2) < 26/1000$ and $0.04 \text{ Wt \%} < N_p < 0.25 \text{ Wt \%}$ where $N_p$ denotes a density of the scattering particles, L denotes a distance between the pair of opposite light entrance planes, D1 denotes a thickness at one of the pair of opposite light entrance planes, and D2 denotes a thickness at a center of the light guide plate.

Preferably, the light guide plate contains therein numerous scattering particles and satisfies following inequalities:

$1.1 \leq \Phi \cdot N_p \cdot L_G \cdot K_C \leq 8.2$ $0.005 \leq K_C \leq 0.1$ where $\Phi$ denotes a scattering cross section of the scattering particles, $N_p$ denotes a density of the scattering particles, $K_C$ denotes a compensation coefficient, and $L_G$ denotes a length in an incident direction of the light from one of the pair of opposite light entrance planes to a position where the thickness of the light guide plate in the direction perpendicular to the light exit plane is thickest.

According to the present invention, the above configuration provides a planar lighting device permitting increase of the absolute value of the brightness of light emitted through the light exit plane without increasing the thickness of the light guide plate and capable of emitting a large amount of illumination light through the light exit plane with a reduced thickness and weight. This permits adapting to a display of enlarged dimensions, in particular to a display of enlarged dimensions for a liquid crystal display device such as a liquid crystal television.

Further, according to the invention, light can be emitted through the light exit plane in a high-in-the-middle, bell-curve brightness distribution by adjusting the amount of light of each light source or other factor, providing a planar lighting device that can be suitably used for a liquid crystal display device such as a liquid crystal television.

Further, the invention provides a planar lighting device capable of emitting light varying in brightness from area to area as determined on the light exit plane.

BRIEF DESCRIPTION OF THE DRAWINGS

These and other objects, features, and advantages of the present invention will be apparent from the following detailed description and accompanying drawings in which.

DETAILED DESCRIPTION OF THE INVENTION

The planar lighting device of the invention will be described in detail below referring to an embodiment illustrated in the accompanying drawings.

Figure 1:
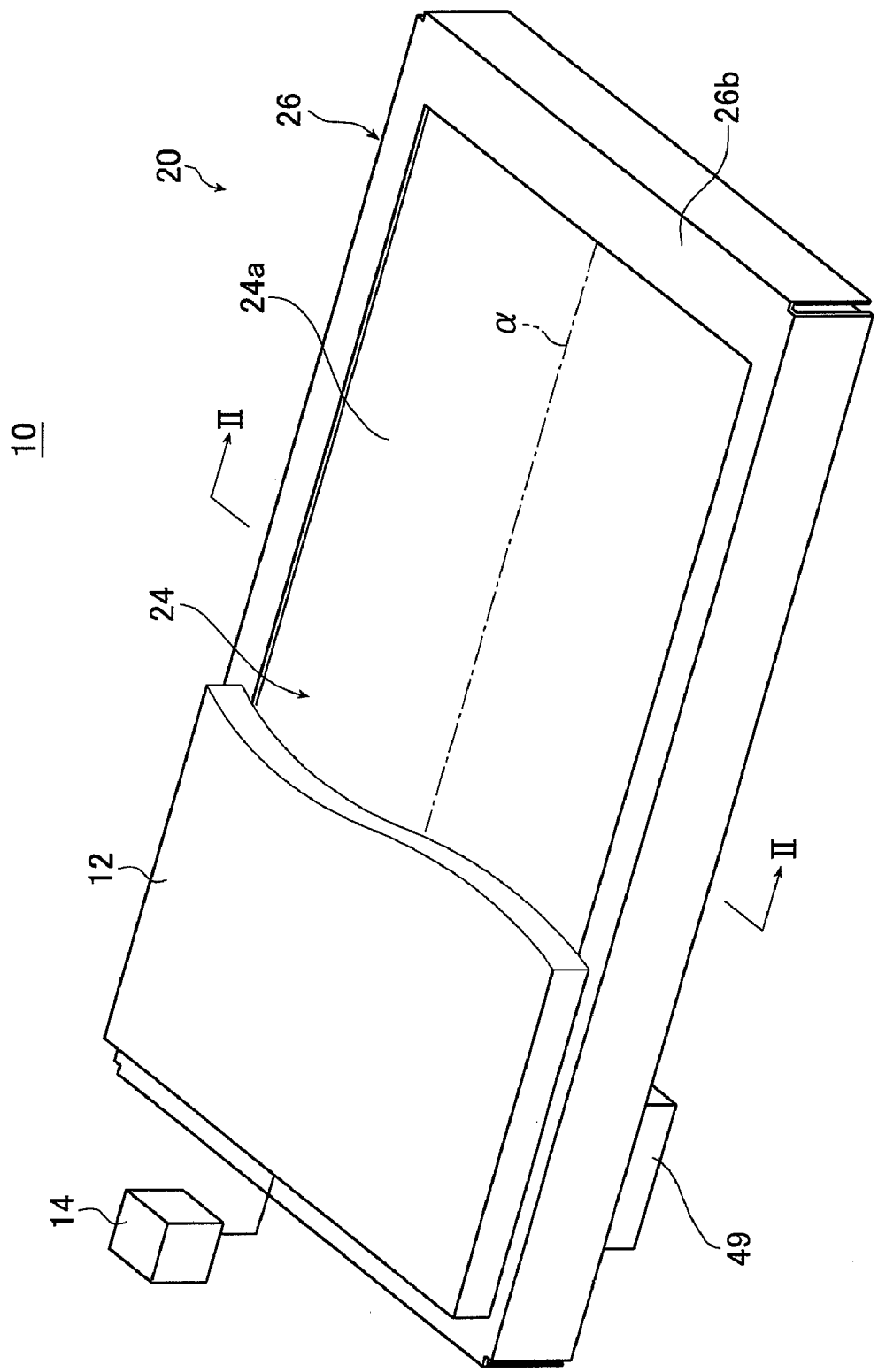
FIG. 1 is a schematic perspective view illustrating an embodiment of a liquid crystal display device using the planar lighting device of the invention.
Figure 2:
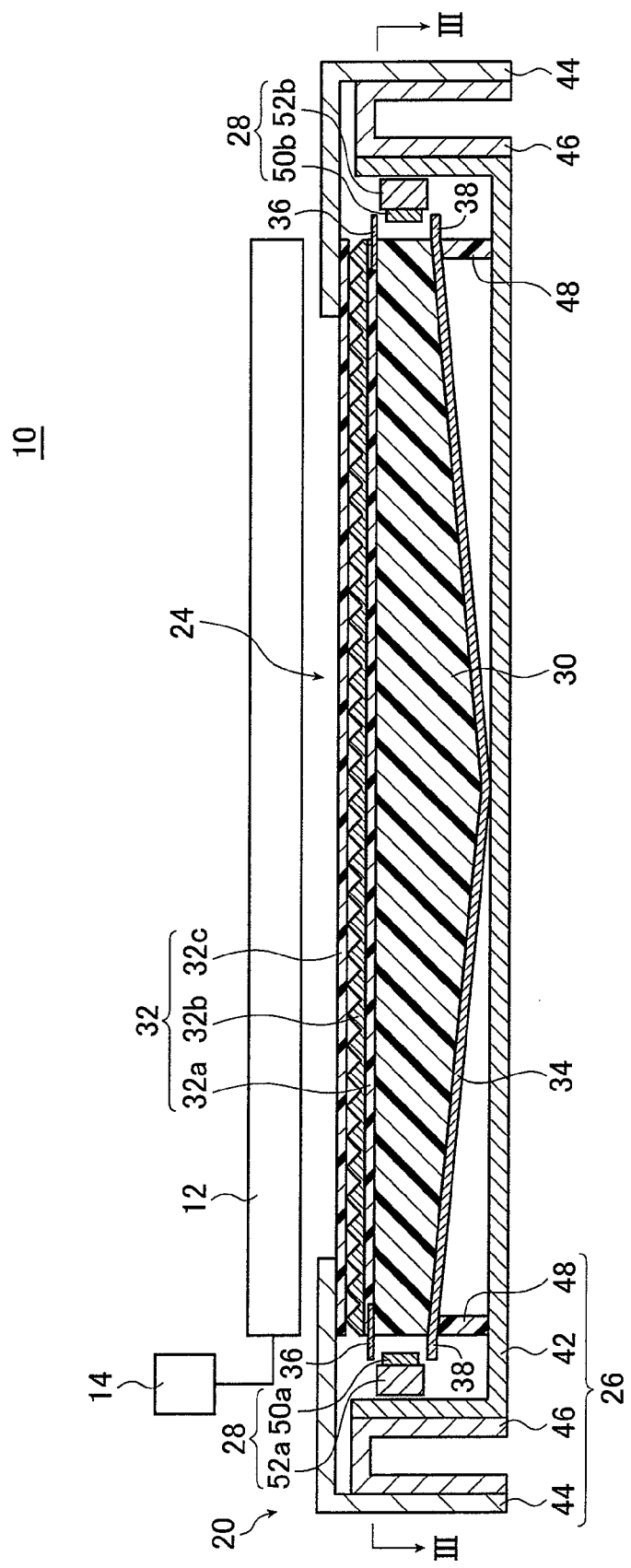
FIG. 2 is a cross sectional view of the liquid crystal display device illustrated in FIG. 1 taken along line II-II.

FIG. 1 is a schematic perspective view illustrating a liquid crystal display device provided with the planar lighting device of the invention; FIG. 2 is a cross sectional view of the liquid crystal display device illustrated in FIG. 1 taken along line II-II.

Figure 3A:
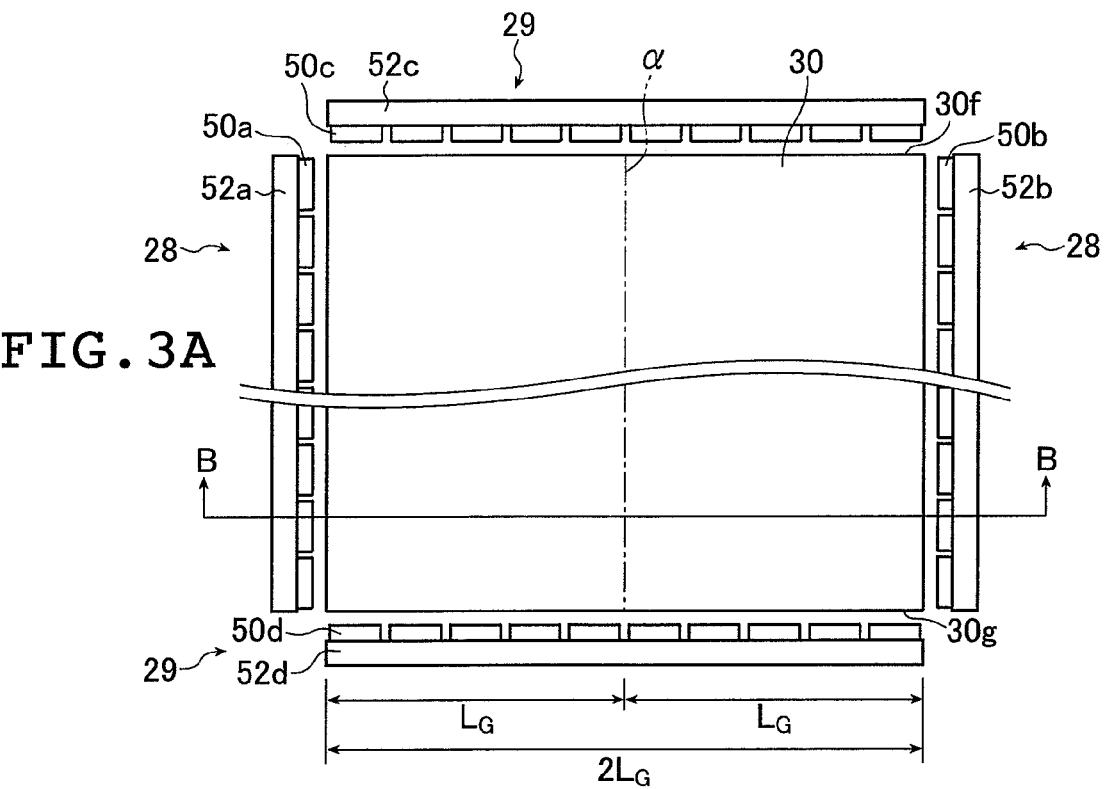
FIG. 3A is a view of an example of the planar lighting device illustrated in FIG. 2 taken along line III-III.
Figure 3B:
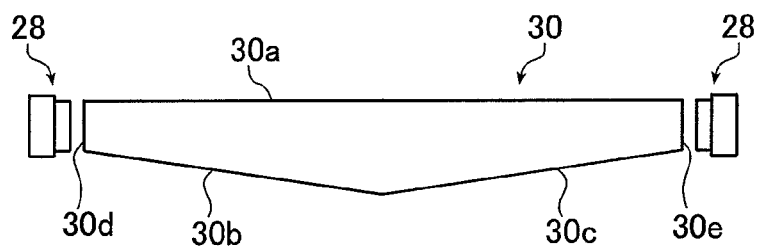
FIG. 3B is a cross sectional view of FIG. 3A taken along line B-B.

FIG. 3A is a view of the planar lighting device (also referred to as "backlight unit" below) illustrated in FIG. 2 taken along line III-III; FIG. 3B is a sectional view of FIG. 3A taken along line B-B.

A liquid crystal display device 10 comprises a backlight unit 20, a liquid crystal display panel 12 disposed on the side of the backlight unit closer to the light exit plane, and a drive unit 14 for driving the liquid crystal display panel 12. In FIG. 1, part of the liquid crystal display panel 12 is not shown to better illustrate the configuration of the planar lighting device.

In the liquid crystal display panel 12, electric field is partially applied to liquid crystal molecules, previously arranged in a given direction, to change the orientation of the molecules. The resultant changes in refractive index in the liquid crystal cells are used to display characters, figures, images, etc., on the liquid crystal display panel 12.

The drive unit 14 applies a voltage to transparent electrodes in the liquid crystal display panel 12 to change the orientation of the liquid crystal molecules, thereby controlling the transmittance of the light transmitted through the liquid crystal display panel 12.

The backlight unit 20 is a lighting device for illuminating the whole surface of the liquid crystal display panel 12 from behind the liquid crystal display panel 12 and comprises a light exit plane having substantially a same shape as an image display surface of the liquid crystal display panel 12.

As illustrated in FIGS. 1, 2, 3A and 3B, the first example of the backlight unit 20 comprises a main body of the lighting device 24 and a housing 26. The main body of the lighting device 24 comprises two main light sources 28, two auxiliary light sources 29, a light guide plate 30, and an optical member unit 32. The housing 26 comprises a lower housing 42, an upper housing 44, turnup members 46, and support members 48. As illustrated in FIG. 1, a power supply casing 49 is provided on the underside of the lower housing 42 of the housing 26 to hold power supply units that supply the main light sources 28 and the auxiliary light sources 29 with electrical power.

Now, components that make up the backlight unit 20 will be described.

The main body of the lighting device 24 comprises the main light sources 28 and the auxiliary light sources 29 for emitting light, the light guide plate 30 for admitting the light emitted by the main light sources 28 and the auxiliary light sources 29 to produce planar light, and the optical member unit 32 for scattering and diffusing the light produced by the light guide plate 30 to obtain light with further reduced unevenness.

First, the main light sources 28 and the auxiliary light sources 29 will be described.

The main light sources 28 and the auxiliary light sources 29 basically have the same configuration except the position with respect to the light guide plate 30. Therefore, only the main light sources 28 will be described as representative.

Figures 4A, 4B, 4C:
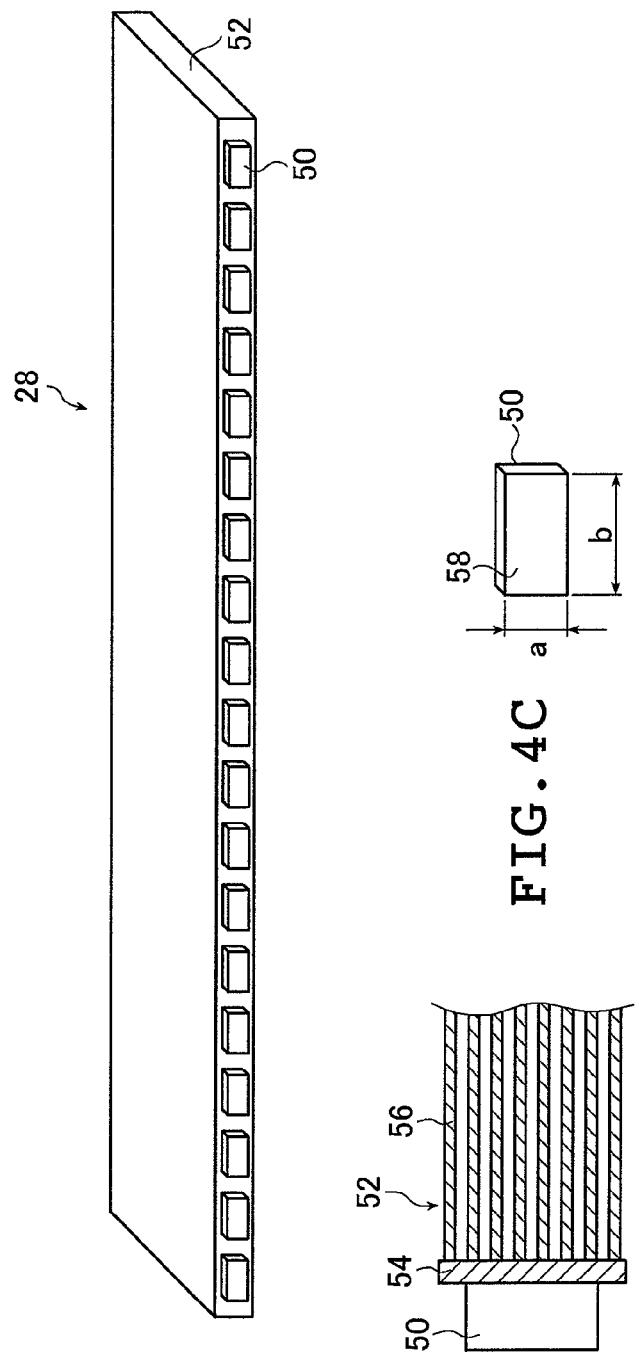
FIG. 4A is a perspective view schematically illustrating a configuration of the light source used in the planar lighting device of FIGS. 1 and 2.
FIG. 4B is a cross sectional view of the light source illustrated in FIG. 4A.
FIG. 4C is a schematic perspective view illustrating one LED of the light source of FIG. 4A as enlarged.

FIG. 4A is a perspective view schematically illustrating a configuration of the main light sources 28 of the planar lighting device 20 of FIGS. 1 and 2; FIG. 4B is a cross sectional view of the main light source 28 illustrated in FIG. 4A; and FIG. 4C is a schematic perspective view illustrating only one LED of the main light source 28 of FIG. 4A as enlarged.

As illustrated in FIG. 4A, the main light source 28 comprises light emitting diode chips (referred to as "LED chips" below) 50 and a light source mount 52.

The LED chip 50 is a chip of a light emitting diode emitting blue light the surface of which has a fluorescent substance applied thereon. It has a light emission face 58 with a given area through which white light is emitted.

Specifically, when blue light emitted through the surface of light emitting diode of the LED chip 50 is transmitted through the fluorescent substance, the fluorescent substance generates fluorescence. Thus, when blue light emitted by the LED chip 50 is transmitted through the fluorescent substance, the blue light emitted by the light emitting diode and the light radiated as the fluorescent substance generates fluorescence blend to produce and emit white light.

The LED chip 50 may for example be formed by applying a YAG (yttrium aluminum garnet) base fluorescent substance to the surface of a GaN base light emitting diode, an InGaN base light emitting diode, etc.

As illustrated in FIG. 4B, the light source mount 52 comprises an array base 54 and fins 56. The LED chips 50 described above are arranged in a single row on the array base 54 at given intervals. Specifically, the LED chips 50 are arrayed along the length of a first light entrance plane 30d or a second light entrance plane 30e of a light guide plate 30 to be described, that is, parallel to a line in which the first light entrance plane 30d or the second light entrance plane 30e meets with a light exit plane 30a.

The array base 54 is a plate member disposed such that one surface thereof faces the thinnest lateral end face of the light guide plate 30, i.e., the first light entrance plane 30d or the second light entrance plane 30e of the light guide plate 30. The LED chips 50 are carried on a lateral plane of the array base 54 facing the light entrance plane 30b of the light guide plate 30.

The array base 54 according to the embodiment under discussion is formed of a metal having a good heat conductance as exemplified by copper and aluminum. The array base 54 also acts as a heat sink to absorb heat generated by the LED chips 50 and releases the heat to the outside.

The fins 56 are plate members each formed of a metal having a good heat conductance as exemplified by copper and aluminum. The fins 56 are connected to the array base 54 on the side thereof opposite from the LED chips 50 and spaced a given distance from neighboring fins 56.

A plurality of fins 56 provided in the light source mount 52 ensure a large surface area and a high heat dissipation efficiency, increasing the efficiency with which the LED chips 50 are cooled.

The heat sink may be not only of air-cooled type but also of water-cooled type.

While the embodiment under discussion uses the array base 54 of the light source mount 52 as heat sink, a plate member without a heat-releasing function may be used to form the array base in place of the array base having a function of a heat sink, where the LED chips need not be cooled.

As illustrated in FIG. 4C, the LED chips 50 of the embodiment under discussion each have a rectangular shape such that the sides perpendicular to the direction in which the LED chips 50 are arrayed are shorter than the sides lying in the direction in which the LED chips 50 are arrayed or, in other words, the sides lying in the direction of thickness of the light guide plate 30 to be described, i.e., the direction perpendicular to the light exit plane 30a, are the shorter sides. Expressed otherwise, the LED chips 50 each have a shape defined by b>a where "a" denotes the length of the sides perpendicular to the light exit plane 30a of the light guide plate 30 and "b" denotes the length of the sides in the array direction. Now, let "q" be the distance by which the arrayed LED chips 50 are spaced apart from each other, then q>b holds. Thus, the length "a" of the sides of the LED chips 50 perpendicular to the light exit plane 30a of the light guide plate 30, the length "b" of the sides in the array direction, and the distance "q" by which the arrayed LED chips 50 are spaced apart from each other preferably have a relationship satisfying q>b>a.

Providing the LED chips 50 each having the shape of a rectangle allows a thinner design of the light source to be achieved while producing a large amount of light. A thinner light source, in turn, enables a thinner design of the planar lighting device to be achieved. Further, the number of LED chips that need to be arranged may be reduced.

While the LED chips 50 each preferably have a rectangular shape with the shorter sides lying in the direction of the thickness of the light guide plate 30 for a thinner design of the light source, the present invention is not limited thereto, allowing the LED chips to have any shape as appropriate such as a square, a circle, a polygon, and an ellipse.

While the LED chips, arranged in a single row, has a monolayered structure in the embodiment under discussion, the present invention is not limited thereto; one may use multilayered LED arrays for the light source comprising LED arrays each carrying LED chips 50 on the array base 54. Where the LEDs are thus stacked, more LED arrays can be stacked when the LED chips 50 are each adapted to have a rectangular shape and when the LED arrays are each adapted to have a reduced thickness. Where the LED arrays are stacked to form a multilayer structure, that is to say, where more LED arrays (LED chips) are packed into a given space, a large amount of light can be generated. Preferably, the above expression also applies to the distance separating the LED chips of an LED array from the LED chips of the LED arrays in adjacent layers. Expressed otherwise, the LED arrays preferably are stacked such that the LED chips are spaced a given distance apart from the LED chips of the LED arrays in adjacent layers.

In the liquid crystal display device 10, provided with the main light sources 28 and the auxiliary light sources 29 as in the example under discussion, the auxiliary light sources 29 are disposed opposite the first light entrance plane 30f and the second light entrance plane 30g of the light guide plate 30 thus providing four light entrance planes to admit light also through the lateral sides of the light guide plate 30. Thus, the absolute value of the illuminance of light emitted through the light exit plane 30a can be improved and the amount of overall light provided by the liquid crystal display device 10 can be increased.

Further, the configuration where the light guide plate has the light sources provided on all the four sides thereof allows a large amount of illumination light to be emitted through the light exit plane, thereby achieving a larger display screen or area for devices in which the light guide plate is used.

According to the invention, the amount of light emitted by the light sources is preferably so adjusted that the illuminance distribution of the light emitted by the light guide plate represents a bell-curve distribution. That is, a bell-curve distribution of illuminance suitable for a display device such as a liquid crystal television is achieved by setting a different amount of light for each of the LED chips constituting at least the main light sources.

In the main light sources 28 according to the embodiment under discussion, the LED chips 50 are independently set to their respective amounts of light such that the amount of light produced is greatest adjacent the central portion or area in the longitudinal direction of the first light entrance plane 30d and the second light entrance plane 30e, decreasing with the increasing distance from the center toward both ends.

The LED chips 50 are preferably set to their respective amounts of light such that the illuminance of light as measured along the bisector α of the light guide plate 30 illustrated in FIG. 3A represents a high-in-the-middle, bell-curve distribution. Specifically, suppose that the amount of light of the LED chips opposite the central portion of the first light entrance plane 30d and the second light entrance plane 30e is 1, then the LED chips 50 are set to their respective amounts of light such that an amount of light I satisfies 0<I≦1 in any other position.

According to the invention, the illuminance of the light emitted through the light exit plane 30a can be formed into a bell-curve distribution, i.e., a distribution where the illuminance gradually increases toward the center, by independently setting the amount of each LED chip 50 such that the LED chips disposed opposite the central portion of the light entrance plane produce a greater amount of light than those disposed opposite the periphery. Where the light emitted through the light exit plane exhibits a bell-curve illuminance distribution so as to provide the central portion of the light entrance plane with the highest illuminance, difference in illuminance between the central area and the periphery appears to be evened out by visual observation such that uniform light seems to be emitted through the light exit plane. Thus, the planar lighting device of the invention is capable of emitting light with an illuminance distribution that is suitable for use in liquid crystal televisions and the like.

To find such a desired illuminance distribution, one may for example use a calculation based on a sequential iteration method or any other appropriate known method.

Preferably, in the second example described above, the LED chips 50 provided on the auxiliary light sources 29 are also independently set to their respective amounts of light as are those on the major light sources 28. That is, where a different amount of light is set independently for each of the LED chips constituting the main light sources and the auxiliary light sources, a bell-curve brightness distribution suitable for a display device such as a liquid crystal television can be achieved. Thus, different illuminances can be set in different areas as designated in the light exit plane 30a. In other words, the amount of light can be set two-dimensionally in the light exit plane 30a. Accordingly, an area control is made possible whereby the brightness in the light exit plane can be adjusted from area to area.

The bell-curve illuminance distribution as measured on the light exit plane can also be achieved with substantially the same effects by adjusting the array density of the LED chips otherwise than by setting the amount of light of the LED chips independently. Specifically, the LED chips 50a and 50b provided on the main light sources 28 may be arranged in a row at an array density that varies according to their position along the length of the first light entrance plane 30d and the second light entrance plane 30e opposite which these LED chips are disposed to achieve a bell-curve brightness distribution.

Further, since the LED chips 50 are so arranged that the LED chips away from the center of the main light source 28 in the array direction may be reduced in number, the manufacturing costs can be reduced and so can power consumption as well.

Now, the light guide plate 30 will be described.

Figure 5:
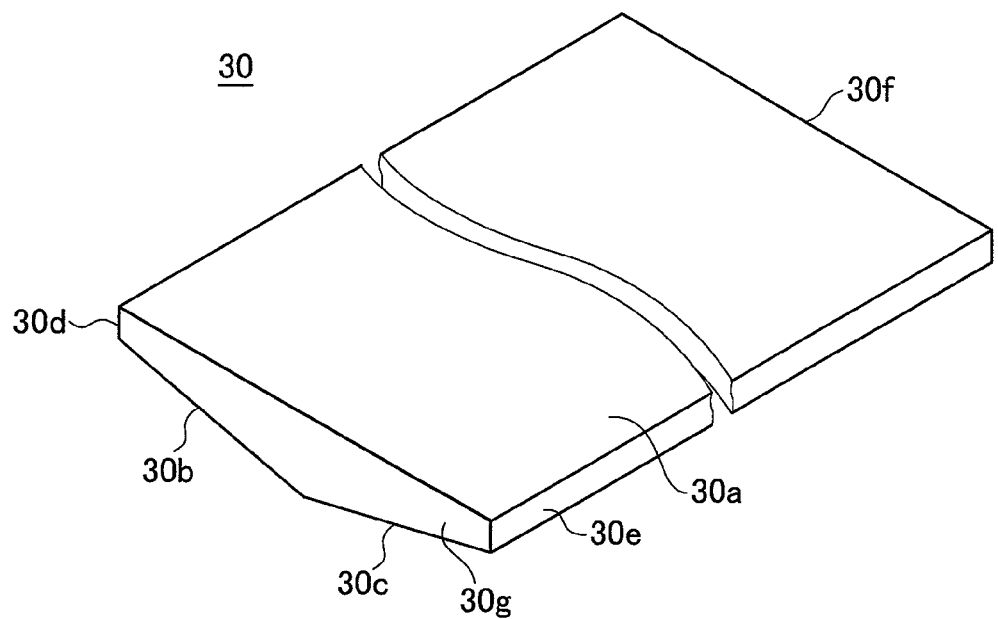
FIG. 5 is a schematic perspective view illustrating a shape of the inventive light guide plate.

FIG. 5 is a perspective view schematically illustrating the configuration of the light guide plate 30.

As illustrated in FIGS. 2, 3, and 5, the light guide plate 30 comprises the light exit plane 30a, which is flat and substantially rectangular; two light entrance planes, the first light entrance plane 30d and the second light entrance plane 30e, formed on both sides of the light exit plane 30a and substantially perpendicular to the light exit plane 30a; two inclined planes, a first inclined plane 30b and a second inclined plane 30c, located on the opposite side from the light exit plane 30a, i.e., on the underside of the light guide plate so as to be symmetrical to each other with respect to a central axis, or the bisector α bisecting the light exit plane 30a (see FIGS. 1 and 3) in a direction parallel to the first light entrance plane 30d and the second light entrance plane 30e, and inclined a given angle with respect to the light exit plane 30a; and two auxiliary light entrance planes, a first light entrance plane 30f and a second light entrance 30g, formed substantially vertical to the light exit plane 30a on the sides of the light exit plane 30a on which the light entrance planes are not formed, i.e., on the two sides perpendicular to the sides where the light exit plane 30a and the light entrance planes meet.

The first inclined plane 30b and the second inclined plane 30c are so inclined as to be distanced farther from the light exit plane 30a with the increasing distance from the first light entrance plane 30d and the second light entrance plane 30e, respectively: expressed otherwise, the thickness of the light guide plate 30 in the direction perpendicular to the light exit plane 30a increases from the first light entrance plane 30d and the second light entrance plane 30e toward the center of the light guide plate 30.

Thus, the light guide plate 30 is thinnest at both sides thereof, i.e., at the first light entrance plane 30d and the second light entrance plane 30e, and thickest at the center, i.e., on the bisector α, where the first inclined plane 30b and the second inclined plane 30c meet. Expressed otherwise, the light guide plate 30 has such a configuration that the thickness of the light guide plate 30 in the direction perpendicular to the light exit plane 30a increases with the increasing distance from the first light entrance plane 30d or the second light entrance plane 30e. The inclination angle of the first inclined plane 30b and the second inclined plane 30c with respect to the light exit plane 30a is not specifically limited.

The two main light sources 28 mentioned above are disposed opposite the first light entrance plane 30d and the second light entrance plane 30e of the light guide plate 30, respectively. Specifically, one of the main light sources 28 comprising LED chips 50a and a light source mount 52a is disposed opposite the first light entrance plane 30d and the other main light source 28 comprising LED chips 50b and a light source mount 52b is disposed opposite the second light entrance plane 30e. In the embodiment under discussion, the light emission face 58 of the LED chips 50 of the light sources 28 has substantially the same length as the first light entrance plane 30d and the second light entrance plane 30e in the direction perpendicular to the light exit plane 30a.

Thus, the planar lighting device 20 has the two major light sources 28 disposed in such a manner as to sandwich the light guide plate 30. In other words, the light guide plate 30 is placed between the two major light sources 28 arranged opposite each other with a given distance between them.

Further, the above-mentioned two auxiliary light sources 29 are each disposed opposite the first auxiliary light entrance plane 30f and the second light entrance plane 30g. Specifically, one of the auxiliary light sources 29 configured by LED chips 50c and a light source mount 52c is disposed opposite the first auxiliary light entrance plane 30f and the other auxiliary light source 29 configured by LED chips 50d and a light source mount 52d is disposed opposite the second auxiliary light entrance plane 30g.

In the light guide plate 30 illustrated in FIG. 2, light entering the light guide plate 30 through the first light entrance plane 30d and the second light entrance plane 30e is scattered as it travels through the inside of the light guide plate 30 by scatterers contained inside the light guide plate 30 as will be described later in detail and, directly or after being reflected by the first inclined plane 30b or the second inclined plane 30c, exits through the light exit plane 30a. Some light can in the process leak through the first inclined plane 30b and the second inclined plane 30c. However, it is then reflected by the reflection plate 34 provided on the side of the light guide plate closer to the first inclined plane 30b and the second inclined plane 30c to enter the light guide plate 30 again. The reflection plate 34 will be described later in detail.

Likewise, the light emitted by the auxiliary light sources 29 and admitted through the first auxiliary light entrance plane 30f and the second auxiliary light entrance plane 30g is scattered as it travels through the inside of the light guide plate 30 by scatterers contained inside the light guide plate 30 as will be described later in detail and, directly or after being reflected by the first inclined plane 30b or the second inclined plane 30c, exits through the light exit plane 30a.

The shape of the light guide plate thus growing thicker in the direction perpendicular to the light exit plane 30a with the increasing distance from the first light entrance plane 30d or the second light entrance plane 30e opposite which the main light source 28 is disposed allows the light admitted through the light entrance planes to travel farther from the light entrance planes and, hence, enables a larger light exit plane to be achieved. Moreover, since the light entering through the light entrance plane is advantageously guided to travel a long distance from the light entrance plane, a thinner design of the light guide plate is made possible.

The light guide plate 30 is formed of a transparent resin into which scattering particles are kneaded and dispersed. Transparent resin materials that may be used to form the light guide plate 30 include optically transparent resins such as PET (polyethylene terephthalate), PP (polypropylene), PC (polycarbonate), PMMA (polymethyl methacrylate), benzyl methacrylate, MS resins, and COP (cycloolefin polymer). The scattering particles kneaded and dispersed into the light guide plate 30 may be formed, for example, of TOSPEARL (trademark), silicone, silica, zirconia, or a derivative polymer. The light guide plate 30 containing the scattering particles is capable of emitting uniform illumination light through the light exit plane with a greatly reduced level of brightness unevenness. The light guide plate 30 so formed may be manufactured using an extrusion molding method or an injection molding method.

Now, let Φ be the scattering cross section of scattering particles contained in the light guide plate 30; $L_G$ the length in the incident direction from the first light entrance plane 30d or the second light entrance plane 30e of the light guide plate 30 to a position where the thickness of the light guide plate 30 in the direction perpendicular to the light exit plane 30a is greatest, said incident direction, expressed otherwise, being the direction parallel to the direction in which light entering the light guide plate travels and perpendicular to the line in which the light exit plane and the light entrance planes, i.e., the first light entrance plane and the second light entrance plane, meet, said length $L_G$ being, in the embodiment under discussion, a half of the length of the light guide plate in the incident direction, which in the embodiment under discussion is the direction perpendicular to the first light entrance plane 30d of the light guide plate 30, as also referred to as "direction of the optical axis" below, or, still otherwise expressed, the length from the first light entrance plane or the second light entrance plane to the bisector α; $N_p$ the density of the scattering particles contained in the light guide plate 30, said density denoting the number of particles in unit volume; and $K_C$ a compensation coefficient. Then the value $\Phi \cdot N_p \cdot L_G \cdot K_C$ is preferably not less than 1.1 and not greater than 8.2; the compensation coefficient $K_C$ is preferably not less than 0.005 and not greater than 0.1. The light guide plate 30, containing scattering particles satisfying the above relationship, is capable of emitting uniform illumination light through the light exit plane 30a with a greatly reduced level of brightness unevenness.

When parallel rays of light are caused to enter an isotropic medium, a transmittance T is generally expressed according to the Lambert-Beer law by the following expression (1):

$$T = I/I_o = \exp(-\rho \cdot x) \qquad (1)$$

where x is a distance, $I_o$ an intensity of incident light, I an intensity of outgoing light, and ρ an attenuation constant.

The above attenuation constant ρ can be expressed using the scattering cross section of particles Φ and the number of particles $N_p$ in unit volume contained in the medium as follows:

$$\rho = \Phi N_p \qquad (2)$$

Accordingly, the light extraction efficiency $E_{out}$ is expressed by the following expression (3) where $L_G$ is the length of the light guide plate in the direction parallel to the direction in which light entering the light guide plate travels from the light entrance planes of the light guide plate as far as the thickest position or, in the embodiment under discussion, a half of the length of the light guide plate in the direction of the optical axis. Said half of the length of the light guide plate in the direction of the optical axis denoted by $L_G$ is the length of the light guide plate 30 in the direction perpendicular to the light entrance planes of the light guide plate 30 from one of the light entrance planes of the light guide plate 30 to the center of the light guide plate 30.

The light extraction efficiency $E_{out}$ is a ratio of light reaching the position spaced apart from the light entrance plane of the light guide plate by the length $L_G$ in the direction of the optical axis to the incident light. In the case of the light guide plate 30 illustrated in FIG. 2, for example, the light extraction efficiency $E_{out}$ is a ratio of light reaching the center of the light guide plate or, light traveling half the length of the light guide plate in the direction of the optical axis to the light incident on either end plane.

$$E_{out} \propto \exp(-\Phi \cdot N_p \cdot L_G) \qquad (3)$$

The expression (3) applies to a space of limited dimensions. Introducing the compensation coefficient $K_C$ therein to correct the relationship with the expression (1), the light extraction efficiency $E_{out}$ is expressed by the following expression (4). The compensation coefficient $K_C$ is a dimensionless compensation coefficient empirically obtained where light propagates through an optical medium of limited dimensions.

$$E_{out} = \exp(-\Phi \cdot N_p \cdot L_G \cdot K_C) \qquad (4)$$

According to the expression (4), when $\Phi \cdot N_p \cdot L_G \cdot K_C$ is 3.5, the light extraction efficiency $E_{out}$ is 3%. When $\Phi \cdot N_p \cdot L_G \cdot K_C$ is 4.7, the light extraction efficiency $E_{out}$ is 1%.

The results show that the light extraction efficiency $E_{out}$ decreases as $\Phi \cdot N_p \cdot L_G \cdot K_C$ increases. The light extraction efficiency $E_{out}$ decreases in such a manner presumably because light is scattered increasingly as it travels in the direction of the optical axis of the light guide plate.

It follows, therefore, that the greater the value $\Phi \cdot N_p \cdot L_G \cdot K_C$ is, the more preferable it is as a property for the light guide plate. When $\Phi \cdot N_p \cdot L_G \cdot K_C$ is great, light exiting through a plane opposite the light entrance plane can be reduced whereas light emitted through the light exit plane can be increased. Expressed otherwise, when $\Phi \cdot N_p \cdot L_G \cdot K_C$ is great, the ratio of light emitted through the light exit plane to the light incident on the light entrance planes can be increased. That ratio is also referred to as "light use efficiency" below. Specifically, a light use efficiency as high as 50% or more is achieved when $\Phi \cdot N_p \cdot L_G \cdot K_C$ is 1.1 or greater.

While light emitted through the light exit plane 30a of the light guide plate 30 increasingly exhibits illuminance unevenness as $\Phi \cdot N_p \cdot L_G \cdot K_C$ increases, the illuminance unevenness can be held to under a given, tolerable level by holding the value $\Phi \cdot N_p \cdot L_G \cdot K_C$ to 8.2 or less. Note that illuminance and brightness can be treated substantially equally. Thus, it is assumed that brightness and illuminance possess similar tendencies in the present invention.

Thus, the value $\Phi \cdot N_p \cdot L_G \cdot K_C$ of the inventive light guide plate 30 is preferably not less than 1.1 and not greater than 8.2, and more preferably not less than 2.0 and not greater than 8.0. Still more preferably, the value $\Phi \cdot N_p \cdot L_G \cdot K_C$ is not less than 3.0 and, most preferably, not less than 4.7.

The compensation coefficient $K_C$ is preferably not less than 0.005 and not greater than 0.1, thus $0.005 \leq K_C \leq 0.1$.

Now, the light guide plate 30 will be described in greater detail by referring to specific examples.

A computer simulation was conducted to obtain light use efficiencies for different light guide plates given different values of $\Phi \cdot N_p \cdot L_G \cdot K_C$ by varying the scattering cross section Φ, the particle density $N_p$, the length $L_G$, which is a half of the length of the light guide plate in the direction of the optical axis, and the compensation coefficient $K_C$. Further, illuminance unevenness was evaluated. The illuminance unevenness (%) was defined as $[(I_{Max} - I_{Min})/I_{Ave}] \times 100$, where $I_{Max}$ was a maximum illuminance of light emitted through the light exit plane of the light guide plate, $I_{Min}$ a minimum illuminance, and $I_{Ave}$ an average illuminance.

Because the incoming light emitted by the auxiliary light sources has a constant illuminance irrespective of the position in the optical axis direction, the evaluation of the example was made under conditions where the auxiliary light sources are not provided.

The measurement results are shown in Table 1. In Table 1, judgments "O" indicate cases where the light use efficiency is 50% or more and the illuminance unevenness is 150% or less whereas judgments "X" indicate cases where the light use efficiency is less than 50% or the illuminance unevenness is more than 150%.

TABLE 1

|  | $\Phi$ [m²] | $N_p$ [pcs/m³] | $L_G$ [m] | $K_C$ | $\Phi \cdot N_p \cdot L_G \cdot K_C$ | Light use efficiency [%] | Illuminance unevenness [%] | Judgment |
|---|---|---|---|---|---|---|---|---|
| Example 1 | $2.0 \times 10^{-12}$ | $2.2 \times 10^{14}$ | 0.3 | 0.03 | 3.51 | 81.6 | 84 | ◯ |
| Example 2 | $2.0 \times 10^{-12}$ | $4.3 \times 10^{14}$ | 0.3 | 0.02 | 6.21 | 84.7 | 149 | ◯ |
| Example 3 | $2.0 \times 10^{-12}$ | $8.6 \times 10^{14}$ | 0.1 | 0.02 | 3.86 | 82.8 | 82 | ◯ |
| Example 4 | $1.1 \times 10^{-10}$ | $1.5 \times 10^{13}$ | 0.3 | 0.008 | 3.91 | 83.0 | 105 | ◯ |
| Example 5 | $1.1 \times 10^{-10}$ | $2.0 \times 10^{13}$ | 0.3 | 0.007 | 4.98 | 84.3 | 142 | ◯ |
| Example 6 | $1.1 \times 10^{-10}$ | $3.5 \times 10^{13}$ | 0.1 | 0.007 | 2.86 | 79.2 | 47 | ◯ |
| Comparative example 1 | $2.0 \times 10^{-12}$ | $2.2 \times 10^{13}$ | 0.3 | 0.05 | 0.66 | 29.1 | 51 | X |
| Comparative example 2 | $1.1 \times 10^{-12}$ | $2.5 \times 10^{12}$ | 0.3 | 0.01 | 0.99 | 43.4 | 59 | X |
| Comparative example 3 | $4.8 \times 10^{-18}$ | $8.6 \times 10^{17}$ | 0.1 | 15.2 | 6.26 | 84.8 | 201 | X |
| Comparative example 4 | $4.8 \times 10^{-18}$ | $1.7 \times 10^{18}$ | 0.1 | 13.9 | 11.5 | 84.9 | 225 | X |

Figure 6:
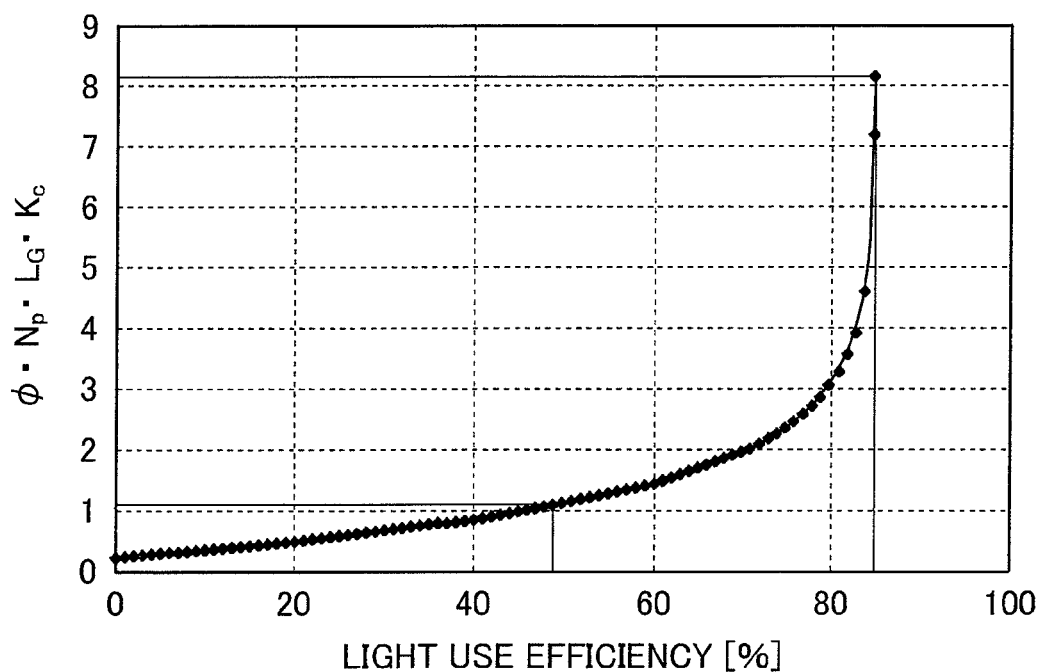
FIG. 6 is a graph illustrating measurements representing a relationship between $\Phi \cdot N_p \cdot L_G \cdot K_C$ and light use efficiency.

FIG. 6 illustrates a relationship between $\Phi \cdot N_p \cdot L_G \cdot K_C$ and light use efficiency, i.e., the ratio of light emitted through the light exit plane 30a to light incident on the light entrance planes.

Figure 8:
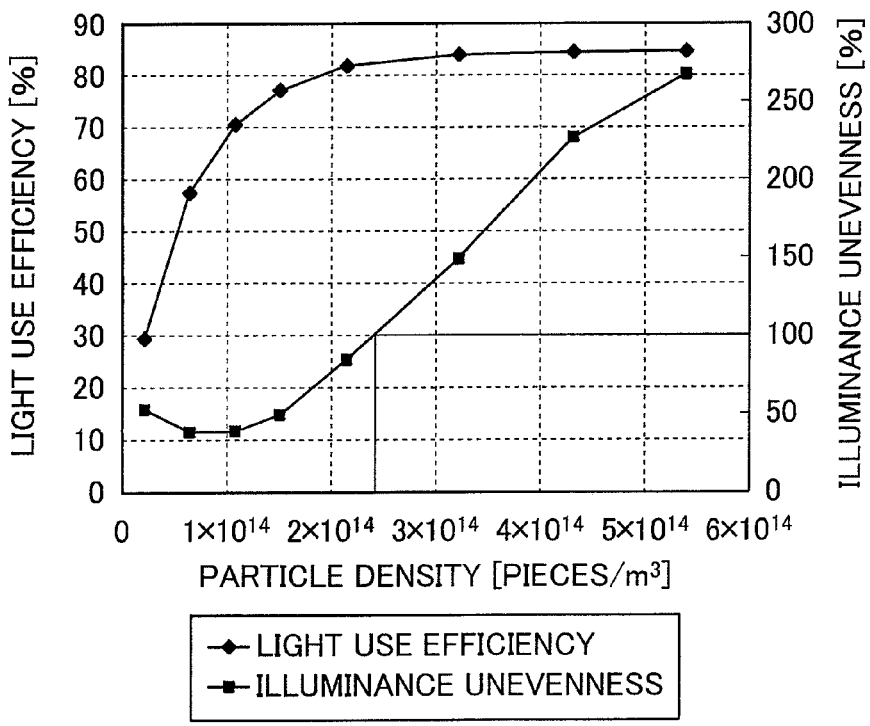
FIG. 8 is a graph illustrating relationships between light use efficiency and illuminance unevenness on the one hand and particle density on the other.

Table 1 and FIG. 8 show that given $\Phi \cdot N_p \cdot L_G \cdot K_C$ of 1.1 or more, a high light use efficiency, specifically 50% or more, is achieved whereas given $\Phi \cdot N_p \cdot L_G \cdot K_C$ of 8.2 or less, illuminance unevenness can be held to 150% or less.

It is also shown that given $K_c$ of 0.005 or more, a high light use efficiency is achieved, and given $K_c$ of 0.1 or less, illuminance unevenness observed in light emitted from the light guide plate can be reduced to a low level.

Next, light guide plates varying in particle density $N_p$ of the particles kneaded or dispersed therein were fabricated to measure brightness distributions of light emitted at different positions in the light exit plane of the individual light guide plates. In the embodiment under discussion, the conditions including scattering cross section $\Phi$, length $L_G$, which is a half of the length of the light guide plate in the direction of its optical axis, compensation coefficient $K_C$, and shape of the light guide plate, but excluding particle density $N_p$, were respectively set to fixed values as the measurements were made. In the embodiment under discussion, therefore, the value $\Phi \cdot N_p \cdot L_G \cdot K_C$ changes in proportion as the particle density $N_p$ changes.

Figure 7:
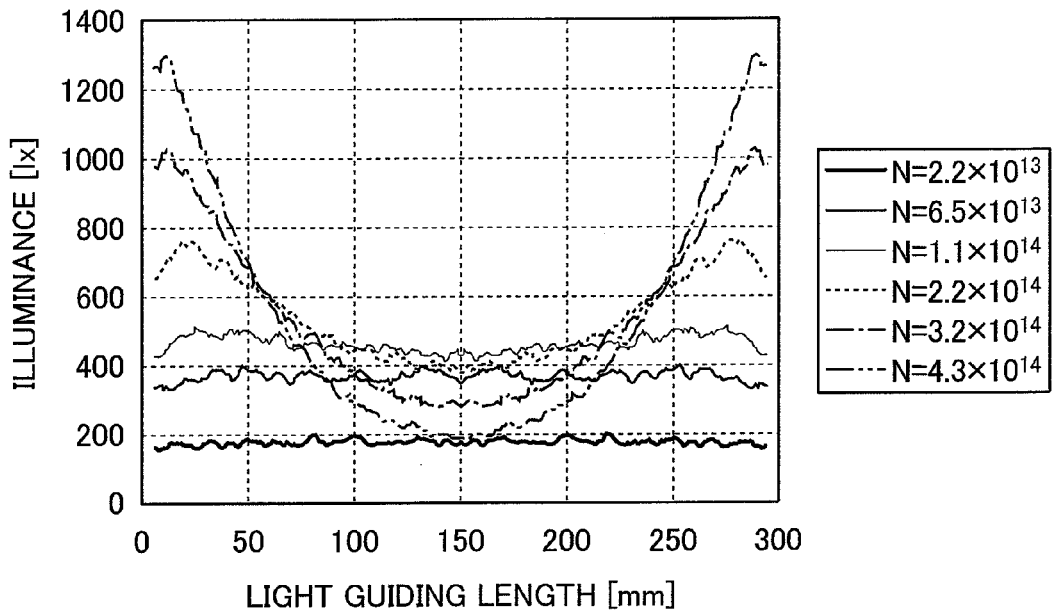
FIG. 7 is a graph illustrating measurements representing illuminances of light emitted by light guide plates each having different particle densities.

FIG. 7 shows the measurements of the distribution of illuminance observed in the light emitted through the light exit plane of the individual light guide plates having different particle densities. FIG. 7 shows the illuminance [lx] on the vertical axis plotted against a light guiding length, which is the distance [mm] from one of the light entrance planes of the light guide plate on the horizontal axis.

Illuminance unevenness was calculated from $[(I_{Max}-I_{Min})/I_{Ave}] \times 100[\%]$, where $I_{Max}$ is a maximum illuminance in the measured distribution of light emitted from areas of the light exit plane close to the lateral ends thereof, $I_{Min}$ is a minimum illuminance, and $I_{Ave}$ is an average illuminance.

Figure 10:
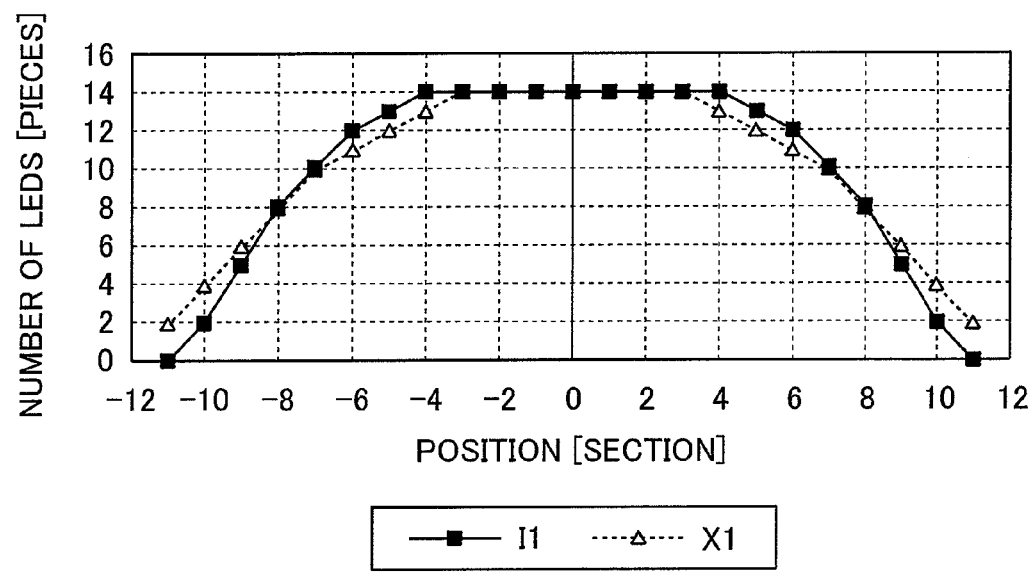
FIG. 10 is a graph illustrating an array density of LED chips in a direction parallel to the plane of incidence and passing through the center of the light guide plate.

FIG. 8 illustrates a relationship between the calculated illuminance unevenness and particle density. FIG. 8 shows the illuminance unevenness [%] on the vertical axis plotted against the particle density [pieces/m³] on the horizontal axis. Also shown in FIG. 10 is a relationship between light use efficiency and particle density, the particle density being likewise indicated on the horizontal axis and the light use efficiency [%] on the vertical axis.

As shown in FIGS. 7 and 8, increasing the particle density or, consequently, increasing $\Phi \cdot N_p \cdot L_G \cdot K_C$, results in an enhanced light use efficiency but then illuminance unevenness also increases. The graphs also show that reducing the particle density or, consequently, reducing $\Phi \cdot N_p \cdot L_G \cdot K_C$, results in lowered light use efficiency but then illuminance unevenness decreases.

$\Phi \cdot N_p \cdot L_G \cdot K_C$ of not less than 1.1 and not greater than 8.2 yields a light use efficiency of 50% or more and illuminance unevenness of 150% or less. Illuminance unevenness, when reduced to 150% or less, is inconspicuous.

Thus, it will be understood that $\Phi \cdot N_p \cdot L_G \cdot K_C$ of not less than 1.1 and not greater than 8.2 yields light use efficiency above a certain level and a reduced illuminance unevenness.

According to the light guide plate 30 as described above used in the example under discussion, the absolute value of the illuminance improves by a factor of about 1.5 where the main light sources 28 and the auxiliary light sources 29 are provided as compared with a case where only the main light sources 28 are provided.

Next, the optical member unit 32 will be described.

The optical member unit 32 serves to reduce the brightness unevenness of the illumination light emitted through the light exit plane 30a of the light guide plate 30 to achieve emission of light with reduced brightness unevenness through a light emission plane 24a of the main body of the lighting device 24. As illustrated in FIG. 2, the optical member unit 32 comprises a diffusion sheet 32a for diffusing the illumination light emitted through the light exit plane 30a of the light guide plate 30 to reduce brightness unevenness, a prism sheet 32b having micro prism arrays formed parallel to the lines where the light exit plane and the light entrance planes meet, and a diffusion sheet 32c for diffusing the illumination light emitted through the prism sheet 32b to reduce brightness unevenness.

The diffusion sheets 32a and 32c and the prism sheet 32b may be provided by making use, for example, of the diffusion sheets and the prism sheets disclosed in paragraphs [0028] through [0033] of JP 2005-234397 A by the Assignee or the Applicant of the present application.

While the optical member unit in the embodiment under discussion comprises the two diffusion sheets 32a and 32c and the prism sheet 32b between the two diffusion sheets, there is no specific limitation to the order in which the prism sheet and the diffusion sheets are arranged or the number thereof to be provided. Nor are the prism sheet and the diffusion sheets specifically limited, and use may be made of various optical members, provided that they are capable of reducing the brightness unevenness of the illumination light emitted through the light exit plane 30a of the light guide plate 30.

For example, the optical members may also be formed of transmittance adjusting members each comprising a number of transmittance adjusters consisting of diffusion reflectors distributed according to the brightness unevenness in addition to or in place of the diffusion sheets and the prism sheet described above. Further, the optical member unit may be adapted to have two layers formed using one sheet each of the prism sheet and the diffusion sheet or two diffusion sheets only.

Now, the reflection plate 34 of the main body of the lighting device will be described.

The reflection plate 34 is provided to reflect light leaking through the first inclined plane 30b and the second inclined plane 30c of the light guide plate 30 back into the light guide plate 30 and helps enhance the light use efficiency. The reflection plate 34 is shaped according to the contour of the first inclined plane 30b and the second inclined plane 30c of the light guide plate 30 to cover the first inclined plane 30b and the second inclined plane 30c. In the embodiment under discussion, the reflection plate 34 is shaped to contour the sectionally triangular shape formed by the first inclined plane 30b and the second inclined plane 30c as illustrated in FIG. 2.

The reflection plate 34 may be formed of any material as desired, provided that it is capable of reflecting light leaking through the inclined planes of the light guide plate 30. The reflection plate 34 may be formed, for example, of a resin sheet produced by kneading, for example, PET or PP (polypropylene) with a filler and then drawing the resultant mixture to form voids therein for increased reflectance; a sheet with a specular surface formed by, for example, depositing aluminum vapor on the surface of a transparent or white resin sheet; a metal foil such as an aluminum foil or a resin sheet carrying a metal foil; or a thin sheet metal having a sufficient reflective property on the surface.

Upper light guide reflection plates 36 are disposed between the light guide plate 30 and the diffusion sheet 32a, i.e., on the side of the light guide plate 30 closer to the light exit plane 30a, covering the main light sources 28 and the end portions of the light exit plane 30a, i.e., the end portion thereof closer to the first light entrance plane 30d and the end portion thereof closer to the second light entrance plane 30e. Thus, the upper light guide reflection plates 36 are disposed to cover an area extending from part of the light exit plane 30a of the light guide plate 30 as far as part of the array bases 54 of the main light sources 28 in a direction parallel to the direction of the optical axis. Briefly, two upper light guide reflection plates 36 are disposed respectively on both end portions of the light guide plate 30.

The upper light guide reflection plates 36 thus provided prevents light emitted by the main light sources 28 from leaking toward the light exit plane 30a instead of entering the light guide plate 30.

Thus, light emitted from the LED chips 50 of the main light sources 28 is efficiently admitted through the first light entrance plane 30d and the second light entrance plane 30e of the light guide plate 30, increasing the light use efficiency.

The lower light guide reflection plates 38 are disposed on the side of the light guide plate 30 opposite from the light exit plane 30a, i.e., on the same side as the first inclined plane 30b and the second inclined plane 30c, covering part of the main light sources 28. The ends of the lower light guide reflection plates 38 closer to the center of the light guide plate 30 are connected to the reflection plate 34.

The upper light guide reflection plates 36 and the lower light guide reflection plates 38 may be formed of any of the above-mentioned materials used to form the reflection plate 34.

The lower light guide reflection plates 38 prevent light emitted by the light sources 28 from leaking toward the first inclined plane 30b and the second inclined plane 30c of the light guide plate 30 instead of entering the light guide plate 30.

Thus, light emitted from the LED chips 50 of the main light sources 28 is efficiently admitted through the first light entrance plane 30d and the second light entrance plane 30e of the light guide plate 30, increasing the light use efficiency.

While the reflection plate 34 is connected to the lower light guide reflection plates 38 in the embodiment under discussion, their configuration is not so limited; they may be formed of separate materials.

The shapes and the widths of the upper light guide reflection plates 36 and the lower light guide reflection plates 38 are not limited specifically, provided that light emitted by the main light sources 28 is reflected and directed toward the first light entrance plane 30d or the second light entrance plane 30e such that light emitted by the main light sources 28 can be admitted through the first light entrance plane 30d or the second light entrance plane 30e and then guided toward the center of the light guide plate 30.

While, in the embodiment under discussion, the upper light guide reflection plates 36 are disposed between the light guide plate 30 and the diffusion sheet 32a, the location of the upper light guide reflection plates 36 is not so limited; it may be disposed between the sheets constituting the optical member unit 32 or between the optical member unit 32 and the upper housing 44.

Further, the upper light guide reflection plates 36 and the lower light guide reflection plates 38 are preferably provided also at the ends of the first auxiliary light entrance plane 30f and the second light entrance plane 30g of the light guide plate 30. Where the upper light guide reflection plates 36 and the lower light guide reflection plates 38 are provided also at the ends of the first auxiliary light entrance plane 30f and the second light entrance plane 30g of the light guide plate 30, the light emitted by the auxiliary light sources 29 can be efficiently admitted into the light guide plate.

Next, the housing 26 will be described.

As illustrated in FIG. 2, the housing 26 accommodates and secures therein the main body of the lighting device 24 by holding it from above and both sides thereof, i.e., the light emission plane 24a and the first inclined plane 30b and the second inclined plane 30c. The housing 26 comprises the lower housing 42, the upper housing 44, the turnup members 46, and the support members 48.

The lower housing 42 is open at the top and has a configuration comprising a bottom section and lateral sections provided upright on the four sides of the bottom section. Briefly, it has substantially the shape of a rectangular box open on one side. As illustrated in FIG. 2, the bottom section and the lateral sections support the main body of the lighting device 24 placed therein from above on the underside and on the lateral sides and covers the faces of the main body of the lighting device 24 except the light emission plane 24a, i.e., the plane opposite from the light emission plane 24a of the main body of the lighting device 24 (rear side) and the lateral sections.

The upper housing 44 has the shape of a rectangular box; it has an opening at the top smaller than the rectangular light emission plane 24a of the main body of the lighting device 24 and is open on the bottom side.

As illustrated in FIG. 2, the upper housing 44 is placed from above the main body of the lighting device 24 and the lower housing 42, that is, from the light exit plane side, to cover the main body of the lighting device 24 and the lower housing 42, which holds the former, as well as four lateral sections 22b.

The turnup members 46 have a substantially U-shaped sectional profile that is identical throughout their length. That is, each turnup member 46 is a bar-shaped member having a U-shaped profile in cross section perpendicular to the direction in which it extends.

As illustrated in FIG. 2, the turnup members 46 are fitted between the lateral sections of the lower housing 42 and the lateral sections of the upper housing 44 such that the outer face of one of the parallel sections of said U shape connects with lateral sections 22b of the lower housing 42 whereas the outer face of the other parallel section connects with the lateral sections of the upper housing 44.

To connect the lower housing 42 with the turnup members 46 and the turnup members 46 with the upper housing 44, one may use any known method such as a method using bolts and nuts and a method using bonds.

Thus providing the turnup members 46 between the lower housing 42 and the upper housing 44 increases the rigidity of the housing 26 and prevents the light guide plate from warping. As a result, for example, light can be efficiently emitted without, or with a greatly reduced level of, brightness unevenness. Further, even where the light guide plate used is liable to develop a warp, the warp can be corrected with an increased certainty or the warping of the light guide plate can be prevented with an increased certainty, thereby allowing light to be emitted through the light exit plane without brightness unevenness or with a greatly reduced level of brightness unevenness.

While the upper housing, the lower housing and the turnup members of the housing may be formed of various materials including metals and resins, lightweight, high-rigidity materials are preferable.

While the turnup members are discretely provided in the embodiment under discussion, they may be integrated with the upper housing or the lower housing. Alternatively, the configuration may be formed without the turnup members.

The support members 48 have an identical profile in cross section perpendicular to the direction in which they extend throughout their length. That is, each support member 48 is a bar-shaped member having an identical cross section perpendicular to the direction in which it extends.

As illustrated in FIG. 2, the support members 48 are provided between the reflection plate 34 and the lower housing 42, more specifically, between the reflection plate 34 and the lower housing 42 close to the end of the first inclined plane 30b of the light guide plate 30 on which the first light entrance plane 30d is located and close to the end of the second inclined plane 30c of the light guide plate 30 on which the second light entrance plane 30e is provided. The support members 48 thus secure the light guide plate 30 and the reflection plate 34 to the lower housing 42 and support them.

With the support members 48 supporting the reflection plate 34, the light guide plate 30 and the reflection plate 34 can be brought into a close contact. Furthermore, the light guide plate 30 and the reflection plate 34 can be secured to a given position of the lower housing 42.

While the support members are discretely provided in the embodiment under discussion, the invention is not limited thereto; they may be integrated with the lower housing 42 or the reflection plate 34. To be more specific, the lower housing 42 may be adapted to have projections to serve as support members or the reflection plates may be adapted to have projections to serve as support members.

The locations of the support members are also not limited specifically and they may be located anywhere between the reflection plate and the lower housing. To stably hold the light guide plate, the support members are preferably located closer to the ends of the light guide plate or, in the embodiment under discussion, near the first light entrance plane 30d and the second light entrance plane 30e.

The support members 48 may be given various shapes and formed of various materials without specific limitations. For example, two or more of the support members may be provided at given intervals.

Further, the support members may have such a shape as to fill the space formed by the reflection plate and the lower housing. Specifically, the support members may have a shape such that the side thereof facing the reflection plate has a contour following the surface of the reflection plate and the side thereof facing the lower housing has a contour following the surface of the lower housing. Where the support members are adapted to support the whole surface of the reflection plates, separation of the light guide plate and the reflection plate can be positively prevented and, further, generation of brightness unevenness that might otherwise be caused by light reflected by the reflection plates can be prevented.

The planar lighting device 20 is basically configured as described above.

In the light guide plate 30, light emitted by the main light sources 28 provided on both sides of the light guide plate 30 strikes the light entrance planes, i.e., the first light entrance plane 30d and the second light entrance plane 30e, of the light guide plate 30 while light emitted by the auxiliary light sources 29 provided on the other two sides of the light guide plate 30 strikes the auxiliary light entrance planes, i.e., the first auxiliary light entrance plane 30f and the second auxiliary light entrance plane 30g. Then, the light admitted through the respective planes is scattered by scatterers contained inside the light guide plate 30 as will be described later in detail as the light travels through the inside of the light guide plate 30 and, directly or after being reflected by the first inclined plane 30b or the second inclined plane 30c, exits through the light exit plane 30a. In the process, part of the light leaking through the first inclined plane 30b and the second inclined plane 30c is reflected by the reflection plate 34 to enter the light guide plate 30 again.

Thus, light emitted through the light exit plane 30a of the light guide plate 30 is transmitted through the optical member 32 and emitted through the light emission plane 24a of the main body of the lighting device 24 to illuminate the liquid crystal display panel 12.

The liquid crystal display panel 12 uses the drive unit 14 to control the transmittance of the light according to the position so as to display characters, figures, images, etc. on its surface.

The illuminance distribution of light emitted through the light exit plane was measured using the inventive planar lighting device.

In the example used for the measurement, the light guide plate had a shape as defined by the following dimensions: the length from the first auxiliary light entrance plane 30f to the second auxiliary light entrance plane 30g measured 1000 mm; a length "d" of the first light entrance plane 30d and the second light entrance plane 30e in the direction perpendicular to the light exit plane measured 580 mm; the length from the light exit plane 30a to the rear side at the bisector α, or, a maximum thickness D, measured 3.5 mm; and a length $L_G$ from the first light entrance plane 30d or the second light entrance plane 30e to the bisector α measured 290 mm.

The weight ratio of the scattering particles mixed into the light guide plate to the light guide plate was 0.07 Wt %.

Figure 9:
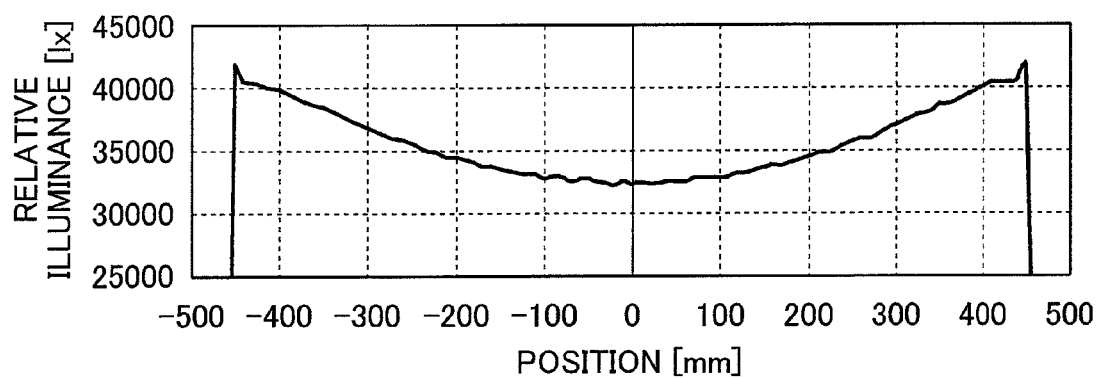
FIG. 9 is a graph illustrating a distribution of illuminance measured in a direction parallel to the plane of incidence and passing through the center of the light guide plate.

FIG. 9 illustrates illuminance distribution of light emitted through the light exit plane of the planar lighting device provided with the light guide plate 30 having the above configuration where the illuminance distribution illustrated was measured along the middle of the light guide plate parallel to the first light entrance plane 30d and the second light entrance plane 30e, i.e., on the bisector α.

FIG. 9 indicates relative illuminance [lx] on the vertical axis plotted against the position [mm] in the longitudinal direction of the first light entrance plane 30d and the second light entrance plane 30e of the light guide plate 30 given on the horizontal axis. The position "0" on the horizontal axis indicates the center of the light guide plate 30 in the longitudinal direction of the first light entrance plane 30d and the second light entrance plane 30e; the positions "−500" and "500" indicate both ends of the light guide plate 30 in the longitudinal direction of the first light entrance plane 30d and the second light entrance plane 30e.

FIG. 10 illustrates an array density of the LED chips 50 varying according to the position in the longitudinal direction of the first light entrance plane 30d and the second light entrance plane 30e.

FIG. 10 is a graph of the LED chip distribution illustrating the array density of the LED chips 50a and 50b along the length of the main light sources 28 of the inventive planar lighting device 10.

FIG. 10 indicates on the horizontal axis the positions [sections] on the light guide plate 30 each having a given unit length, which is 4 mm in the example under discussion, into which the longitudinal length of the first light guide plate 30d and the second light guide plate 30e is divided, plotted against the number of LED chips [pieces] arranged in each section having a given unit length on the vertical axis. The section "0" on the horizontal axis indicates the 4-mm range containing the center of the light guide plate 30 in the longitudinal direction of the first light entrance plane 30d and the second light entrance plane 30e; the sections "−12" and "12" indicate the outermost ranges between each of the outermost ends of the light guide plate 30 and a point 4 mm from said end toward the center in the longitudinal direction of the first light entrance plane 30d and the second light entrance plane 30e.

The example under discussion uses two different array density patterns, I1 and X1, to array the LED chips 50 as illustrated in FIG. 10.

The array density is preferably so determined as to provide a high-in-the-middle, bell-curve illuminance distribution as measured along a bisector a of the light guide plate 30. To find an array density for the LED chips 50 whereby a bell-curve illuminance distribution is obtained, one may for example use a calculation based on a sequential iteration method or any other appropriate known method.

In the example under discussion, the LED chips 50 are arranged at a density of 14 pieces per section (4-mm range) in the array density patterns I1 and X1 in the positions opposite the central portion of the first light entrance plane 30d and the second light entrance plane 30e of the light guide plate 30, i.e., the position "0" on the horizontal axis, as illustrated in FIG. 10. The array density of the LED chips 50 decreases with the increasing distance from the center of the first light entrance plane 30d and the second light entrance plane 30e such that the number of LED chips 50 per section is 0 in the positions "−11" and "11" in the case of array density pattern I1 and in the positions "−12" and "12" in the case of array density pattern X1, i.e., the positions opposite both ends of the first light entrance plane 30d and the second light entrance plane 30e.

In both patterns I1 and X1, the array density peaks adjacent the central portion of the first light entrance plane 30d and the second light entrance plane 30e, i.e., adjacent the position "0" on the horizontal axis in FIG. 10. Now, let the array density be 1 at the center, then the LED chips 50 are arrayed at an array density D satisfying 0<D≦1 in any other position.

The LED chips 50 are preferably arranged such that the array density is highest at a central portion in the lengthwise direction of the first light entrance plane 30d and the second light entrance plane 30e, the array density decreasing with the increasing distance from the center. Thus, a bell-curve distribution can be obtained for the light emitted by the light guide plate 30.

Figure 11:
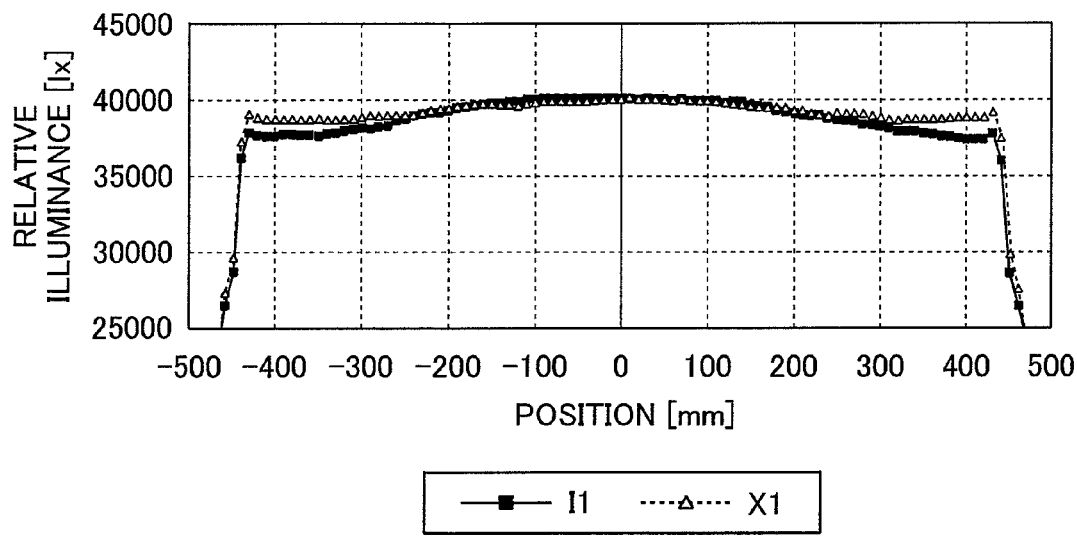
FIG. 11 is a graph illustrating a illuminance distribution obtained using the LED chips arranged at the array density of FIG. 10 as measured in a direction parallel to the plane of incidence and passing through the center of the light guide plate.
Figure 12:
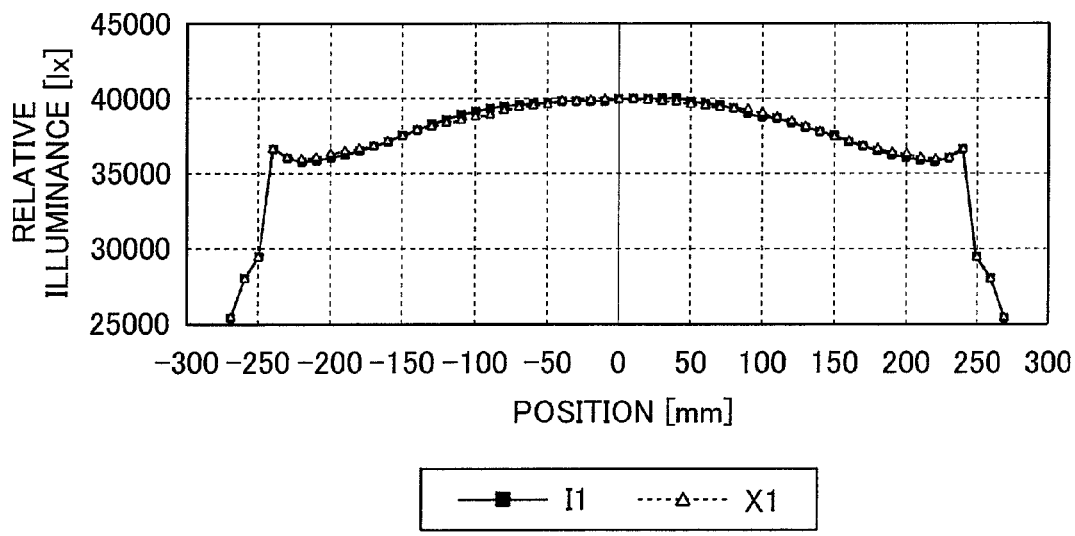
FIG. 12 is a graph illustrating an illuminance distribution obtained using the LED chips arranged at the array density of FIG. 10 as measured in a direction parallel to the auxiliary light entrance planes of the light guide plate and passing through the center thereof.

FIGS. 11 and 12 illustrate illuminance distributions obtained using the light guide plate 30 where the LED chips are arrayed at the density given in FIG. 10.

FIG. 11 illustrates illuminance distributions of the light as measured on the light exit plane 30a in a direction parallel to the longitudinal direction of the first light entrance plane 30d and the second light entrance plane 30e and passing through the center of the light guide plate 30. In this case, the LED chips 50 were arranged at the array density patterns I1 and X1 of FIG. 10. FIG. 11 indicates the relative illuminance [lx] on the vertical axis plotted against the position [mm] in the longitudinal direction of the first light entrance plane 30d and the second light entrance plane 30e of the light guide plate 30 on the horizontal axis.

As illustrated in FIG. 11, whether the array density pattern I1 or X1 is used, the illuminance peaks adjacent the central area, i.e., adjacent the position "0" on the horizontal axis and decreases down the periphery, representing a bell-curve illuminance distribution.

FIG. 12 illustrates an illuminance distribution of light on the light exit plane 30a in a direction parallel to the longitudinal direction of the first auxiliary light entrance plane 30f and the second auxiliary light entrance plane 30g and passing through the center of the light guide plate 30. Note that in the example under discussion, the array density of the LED chips 50 is constant throughout the length of the auxiliary light sources 29.

FIG. 12 indicates the relative illuminance [lx] on the vertical axis plotted against the position [mm] in the longitudinal direction of the first auxiliary light entrance plane 30f and the second auxiliary light entrance plane 30g on the horizontal axis.

As is apparent from FIG. 12, the illuminance distribution along the length of the first auxiliary light entrance plane 30f and the second auxiliary light entrance plane 30g represents a bell curve distribution where the illuminance peaks at the center, i.e., adjacent the position "0" on the horizontal axis, decreasing with the increasing distance from the center toward both ends, almost regardless of whether the LED chips 50 on the main light sources 28 are arrayed at the array density pattern I1 or X1.

It follows, therefore, that where the LED chips 50 are provided on the main light sources 28 with such array densities as illustrated in FIG. 10, illuminance distributions as illustrated in FIGS. 11 and 12 can be obtained where the illuminance adjacent the central portion of the light exit plane 30a is higher than in the periphery thereof, representing a high-in-the-middle, bell-curve illuminance distribution.

Further, in the embodiment under discussion, let D1 be the thickness of the light guide plate at its light entrance plane (thickness of the light guide plate at a location at which light is admitted); D2 the thickness of the light guide plate at a location where the light guide plate is thickest, which, in the embodiment under discussion, is the thickness of the light guide plate where the bisector α thereof is located (thickness at the center); and L the length of the light guide plate in the incident direction from the first light entrance plane to the second light entrance plane (light guiding length), L being $2L_G$ in the embodiment under discussion. Then, it is preferable that the following relationships hold:

D1<D2 and $$27/100000 < (D2-D1)/(L/2) < 5/100 \quad \text{(A); and}$$

that the ratio Npa of the weight of the scattering particles contained to the weight of the light guide plate satisfies a range:

0.04 Wt %<Npa<0.25 Wt %.

When the above relationships are satisfied, the light emission efficiency of the main light sources can be increased to 30% or more.

Alternatively, it is also preferable that the light guide plate is improved such that the following relationships hold:

D1<D2 and $$66/100000 < (D2-D1)/(L/2) < 26/1000 \quad \text{(B); and}$$

that the ratio Npa of the weight of the contained scattering particles to the weight of the light guide plate satisfies a range:

0.04 Wt %<Npa<0.25 Wt %.

When the above relationships are satisfied, the light emission efficiency of the main light sources can be increased to 40% or more.

It is preferable that the light guide plate is improved such that the following relationships hold:

D1<D2 and $$1/1000 < (D2-D1)/(L/2) < 26/1000 \quad \text{(C); and}$$

that the ratio Npa of the weight of the contained scattering particles to the weight of the light guide plate satisfies a range of:

0.04 Wt %<Npa<0.25 Wt %.

When the above relationships are satisfied, the light emission efficiency can be increased to 50% or more.

Figure 13:
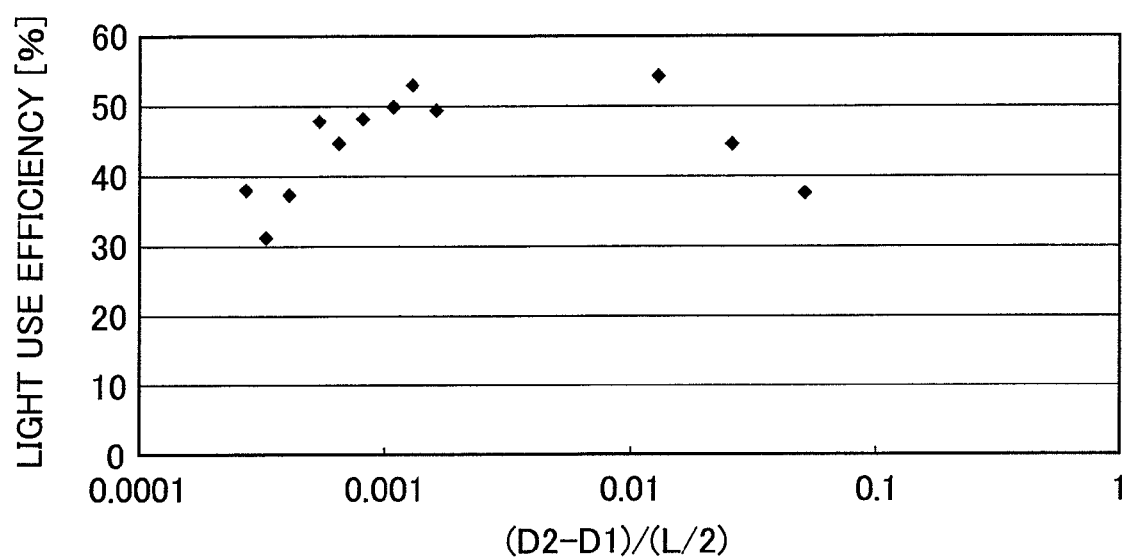
FIG. 13 is a graph illustrating measurements of light use efficiency obtained using light guide plates having different configurations.

FIG. 13 illustrates measurements of the light use efficiency of light guide plates of which the inclined planes have different inclination angles from each other, i.e., light guide plates having various shapes with different values of (D2−D1)/(L/2). Because the light guide plates according to the example used for the measurements have a flat shape in the direction in which light emitted by the auxiliary light sources travels and, therefore, light use efficiency is substantially not changed by the shape of the inclined planes, only the main light sources were provided to measure the light use efficiency thereof.

FIG. 13 indicates (D2−D1)/(L/2) of the light guide plate on the horizontal axis plotted against light use efficiency [%] on the vertical axis.

As will be apparent from the measurements illustrated in FIG. 13, when the light guide plate has a shape satisfying 27/100000<(D2−D1)/(L/2)<5/100, the light use efficiency can be increased to 30% or more; when the light guide plate has a shape satisfying 66/100000<(D2−D1)/(L/2)<26/1000, the light use efficiency can be increased to 40% or more; and when the light guide plate has a shape satisfying 1/1000<(D2−D1)/(L/2)<26/1000, the light use efficiency can be increased to 50% or more.

The light guide plate may have any shape without limitation to the above shape, provided that the thickness of the light guide plate increases with the increasing distance from the light entrance plane.

For example, prism arrays may be formed on the first inclined plane 30b and the second inclined plane 30c in the direction parallel to the first light entrance plane 30d and the second light entrance plane 30e. Instead of such prism arrays, optical elements similar to prisms may be provided and arranged regularly. For example, elements having lens effects such as lenticular lenses, concave lenses, convex lenses, or optical elements in pyramidal shape may be formed on the inclined planes of the light guide plate.

In the embodiment under discussion, the light exit plane 30a of the light guide plate 30 has the longer sides adjacent the light entrance planes and the shorter sides adjacent the auxiliary light entrance planes in order to emit light through the light exit plane with an enhanced brightness and efficiency. The invention, however, is not limited to such a configuration; the light exit plane may be formed into a square or the sides thereof adjacent the light entrance planes may be the shorter sides and the sides thereof adjacent the auxiliary light entrance planes may be the longer sides.

The joint between the first inclined plane and the second inclined plane of the light guide plate preferably has a rounded shape. Where the joint between the first inclined plane and the second inclined plane of the light guide plate has a rounded shape connecting the two planes smoothly, generation of brightness unevenness observed as, for example, a bright line on the line of intersection between the first inclined plane and the second inclined plane can be prevented.

While, in the embodiment under discussion, the inclined planes of the light guide plate are defined by a straight line in cross section, the shape of the first inclined plane and the second inclined plane, i.e., the underside of the light guide plate, is not limited specifically. The first inclined plane and the second inclined plane may be defined by a curved surface or each of them may have two or more inclined sections. In other words, each inclined plane may have inclined sections having different inclination angles according to their position. Further, the inclined planes may be curved outwardly or inwardly with respect to the light exit plane, or may have outwardly and inwardly curved sections combined.

The inclined planes preferably have a configuration such that their inclination angle with respect to the light exit plane decreases from the light entrance planes toward the center of the light guide plate or toward a position where the light guide plate is thickest. Where the inclination angle of the inclined planes gradually decreases, light having less brightness unevenness can be emitted through the light exit plane.

The inclined planes more preferably have an aspherical cross section that may be expressed by a 10-th order polynomial. Where the inclined planes have such a configuration, light having less brightness unevenness can be emitted regardless of the thickness of the light guide plate.

Further, the shape of the light guide plate is not limited to that of the embodiment under discussion; for example, the first inclined plane and the second inclined plane may have different inclinations from each other. Still further, the light guide plate may have a shape such that the distance between the first light entrance plane and the position where the light guide plate is thickest is different from the distance between the second light entrance plane and the position where the light guide plate is thickest. Described otherwise, the length of the first inclined plane in the direction of the optical axis is different from that of the second inclined plane in the direction of the optical axis.

The light guide plate having such a shape is also capable of allowing light to travel a long distance from the light entrance planes, while keeping a thin design. This enables a reduced thickness of the light guide plate and a larger light exit plane to be achieved.

Again, with the light guide plate having the above shape, preferably the value $\Phi \cdot N_p \cdot L_G \cdot K_C$ is in the range of not less than 1.1 and not greater than 8.2, and $0.005 \leq K_C \leq 0.1$, where $L_G$ is the length in the incident direction from the light entrance plane to the position where the thickness of the light guide plate in the direction perpendicular to the light exit plane is thickest. When the above ranges are satisfied, light can be emitted through the light exit plane with a reduced illuminance unevenness and a high light use efficiency.

The light guide plate may be fabricated by mixing a plasticizer into a transparent resin.

Fabricating the light guide plate from a material thus prepared by mixing a transparent material and a plasticizer provides a flexible light guide plate, allowing the light guide plate to be deformed into various shapes. Accordingly, the surface of the light guide plate can be formed into various curved surfaces.

Where the light guide plate is given such flexibility, the light guide plate or the planar lighting device using the light guide plate can even be mounted to a wall having a curvature when used, for example, for a display board employing ornamental lighting (illuminations). Accordingly, the light guide plate can be used for a wider variety of applications and in a wider application range including ornamental lighting and POP (point-of-purchase) advertising.

Said plasticizer is exemplified by phthalic acid esters, or, specifically, dimethyl phthalate, diethyl phthalate (DEP), dibutyl phthalate (DBP), di(2-ethylhexyl) phthalate (DOP (DEHP)), di-n-octyl phthalate (DnOP), diisononyl phthalate (DINP), dinonyl phthalate (DNP), diisodecylphthalate (DIDP), phthalate mixed-base ester ($C_6$ to $C_{11}$) (610P, 711P, etc.) and butylbenzyl phthalate (BBP). Besides phthalic acid esters, said plasticizer is also exemplified by dioctyl adipate (DOA), diisononyl adipate (DINA), dinormal alkyl adipate ($C_{6, 8, 10}$) (610A), dialkyl adipate ($C_{7, 9}$) (79A), dioctyl azelate (DOZ), dibutyl sebacate (DBS), dioctyl sebacate (DOS), tricresyl phosphate (TCP), tributyl acetylcitrate (ATBC), epoxidized soybean oil (ESBO), trioctyl trimellitate (TOTM), polyesters, and chlorinated paraffins.

While the inventive planar lighting device has been described above in detail, the invention is not limited in any manner to the above embodiment and various improvements and modifications may be made without departing from the spirit of the present invention.

For example, while each LED chip of the light sources is formed by applying YAG fluorescent substance to the light emission face of a blue LED, the LED chip may be formed otherwise without limitations to such a configuration. For example, the LED chip used herein may be formed using a different monochromatic LED such as a red LED or a green LED with a fluorescent substance.

Further, an LED unit formed using three kinds of LEDs, i.e., a red LED, a green LED, and a blue LED, may be used. In that case, light beams emitted by the three kinds of LEDs are blended to produce white light.

Alternatively, a semiconductor laser (LD) may be used instead of an LED.

Further, one may provide between the light guide plate and each of the light sources (main light sources and/or auxiliary light sources) a portion formed of a material having a refractive index close to that of the light guide plate. Alternatively, part of the light entrance planes and/or the auxiliary light entrance planes of the light guide plate may be formed of a material having a smaller refractive index than the other parts.

Where the part through which light emitted by the light source is admitted is adapted to have a smaller refractive index than the other parts, light emitted by the light source can be admitted more efficiently, and the light use efficiency can be further enhanced.

Further, two or more light guide plates may be juxtaposed by connecting their auxiliary light entrance planes to provide a single light exit plane formed by a plurality of light guide plates. In that case, the auxiliary light sources may be provided only on the auxiliary light entrance planes of the outermost light guide plates.

In the embodiment under discussion, the auxiliary light sources are provided opposite the auxiliary light entrance planes of the light guide plate in order to further increase the brightness of the light emitted through the light exit plane and obtain a bell-curve brightness distribution as observed in the two mutually orthogonal directions. However, the invention is not limited to such a configuration; one may use a configuration, for example, whereby the auxiliary light sources are not provided and only the main light sources are provided to admit light through the light entrance planes.

What is claimed is:

1. A planar lighting device comprising:
    a light guide plate including:
        a light exit plane being flat and rectangular, for emitting planar light;
        four light entrance planes, each for admitting light traveling parallel to said light exit plane, and each being formed along each of four sides of said light exit plane; and
        a pair of rear planes being formed on a side opposite from said light exit plane and inclined such that a thickness of said light guide plate in a direction perpendicular to said light exit plane grows thicker with an increasing distance from each of a pair of opposite light entrance planes in said four light entrance planes and joining each other in a middle between said pair of opposite light entrance planes; and
    four light sources, each for emitting each of said four light entrance planes and for admitting the emitted light through said four light entrance planes, and each being disposed opposite each of said four light entrance planes of said light guide plate,
    wherein each of said four light sources has LED chips and a support for supporting said LED chips, and
    wherein said LED chips of each of said four light sources are arrayed on a plane of said support facing each of said four light entrance planes in a longitudinal direction of each of said four light entrance planes.

2. The planar lighting device according to claim 1, wherein said LED chips comprise LEDs emitting the light having different amounts of light, respectively.

3. The planar lighting device according to claim 1, wherein said LED chips are adjusted independently of each other to their respective amounts of light.

4. The planar lighting device according to claim 2, wherein an amount of light I of each of said LED chips is adjusted to satisfy $0 < I \leq 1$ when an amount of light of one of said LED chips adjacent a central portion of each light entrance plane is 1.

5. The planar lighting device according to claim 1, wherein said four light entrance planes comprises:
- a first light entrance plane and a second light entrance plane being formed on a pair of opposite sides of said light exit plane and constituting said pair of opposite light entrance planes, and
- a third light entrance plane and a fourth light entrance plane being formed on another pair of opposite sides of said light exit plane and constituting another pair of opposite light entrance planes,
- wherein said pair of rear planes are composed of a pair of inclined planes that are parallel to said light exit plane in a direction along said first light entrance plane and said second light entrance plane, respectively, come closest to said light exit plane at said first light entrance plane and said second light entrance plane, respectively, and are distanced farthest from said light exit plane along a central joint of said pair of rear planes joining each other in the middle between said first light entrance plane and said second light entrance plane.

6. The planar lighting device according to claim 1, wherein each of said LED chips has a configuration satisfying an inequality b>a where "a" denotes a length in a thickness direction of said light guide plate and "b" denotes a length in a direction perpendicular to said thickness direction of said light guide plate.

7. The planar lighting device according to claim 1, wherein said light guide plate contains therein numerous scattering particles, and satisfies following inequalities:

$$27/100000 < (D2-D1)/(L/2) < 26/1000 \text{ and}$$

$$0.04 \text{ Wt\%} < N_p < 0.25 \text{ Wt\%}$$

where $N_p$ denotes a density of said scattering particles, L denotes a distance between said pair of opposite light entrance planes, D1 denotes a thickness at one of said pair of opposite light entrance planes, and D2 denotes a thickness at a center of said light guide plate.

8. The planar lighting device according to claim 1, wherein said light guide plate contains therein numerous scattering particles and satisfies following inequalities:

$$1.1 \leq \Phi \cdot N_p \cdot L_G \cdot K_C \leq 8.2$$

$$0.005 \leq K_C \leq 0.1$$

where $\Phi$ denotes a scattering cross section of the scattering particles, $N_p$ denotes a density of said scattering particles, $K_C$ denotes a compensation coefficient, and $L_G$ denotes a length in an incident direction of the light from one of said pair of opposite light entrance planes to a position where said thickness of said light guide plate in the direction perpendicular to said light exit plane is thickest.

* * * * *